US012639358B2

(12) United States Patent
Linder et al.

(10) Patent No.: US 12,639,358 B2
(45) Date of Patent: May 26, 2026

(54) COMPUTER-ASSISTED CONVERSION OF VIDEO DESCRIPTION OF PROCESS INTO APPLICATION FOR PROCESS CONTROL

(71) Applicant: Tulip Interfaces, Inc., Somerville, MA (US)

(72) Inventors: Natan Linder, Cambridge, MA (US); Rony Kubat, Brookline, MA (US); Roy Shilkrot, Arlington, MA (US); Mason Guy Glidden, Cambridge, MA (US)

(73) Assignee: Tulip Interfaces, Inc., Somerville, MA (US)

( * ) Notice: Subject to any disclaimer, the term of this patent is extended or adjusted under 35 U.S.C. 154(b) by 0 days.

(21) Appl. No.: 19/358,890

(22) Filed: Oct. 15, 2025

(65) Prior Publication Data

US 2026/0036959 A1     Feb. 5, 2026

Related U.S. Application Data

(63) Continuation of application No. PCT/US2024/024827, filed on Apr. 16, 2024.

(Continued)

(51) Int. Cl.
*G06F 16/34*          (2025.01)
*G05B 19/042*         (2006.01)
(Continued)

(52) U.S. Cl.
CPC ....... *G06F 16/345* (2019.01); *G05B 19/0426* (2013.01); *G05B 19/41845* (2013.01);
(Continued)

(58) Field of Classification Search
CPC .................. G05B 19/0426; G05B 2219/23249
See application file for complete search history.

(56) References Cited

U.S. PATENT DOCUMENTS 4,995,087 A  *  2/1991  Rathi ................. G05B 19/4207
                                                  382/280
6,476,858 B1 *  11/2002  Ramirez Diaz .... G08B 13/1968
                                                  348/E7.086

(Continued)

FOREIGN PATENT DOCUMENTS

WO     WO- 2024220444       10/2024

OTHER PUBLICATIONS

WIPO, , "PCT Application No. PCT/US24/24827 International Preliminary Report on Patentability mailed Oct. 30, 2025", NPL-2 , 11 pages.

(Continued)

*Primary Examiner* — Kidest Worku
(74) *Attorney, Agent, or Firm* — Strategic Patents, P.C.

(57)          ABSTRACT

A video of a manufacturing process, along with accompanying narration and other descriptive materials, can be used to automatically generate an application for control of the manufacturing process, or assist in a semi-automated generation of the application. As a significant advantage, a generative artificial intelligence system can support the application creation process by providing domain-specific process knowledge and no-code/low-code programming tools to convert general process descriptions into an application that is executable in the manufacturing environment for the process.

20 Claims, 10 Drawing Sheets

Related U.S. Application Data

(60) Provisional application No. 63/459,656, filed on Apr. 16, 2023.

(51) Int. Cl.

| | |
|---|---|
| *G05B 19/418* | (2006.01) |
| *G06F 9/48* | (2006.01) |
| *G06F 16/383* | (2019.01) |
| *G06N 3/0475* | (2023.01) |

(52) U.S. Cl.
CPC .......... *G06F 9/4887* (2013.01); *G06F 16/383* (2019.01); *G06N 3/0475* (2023.01); *G05B 2219/23249* (2013.01)

(56) References Cited

U.S. PATENT DOCUMENTS

| | | | | |
|---|---|---|---|---|
| 2013/0227366 | A1* | 8/2013 | Lau ..................... | G06F 11/3688 714/E11.159 |
| 2014/0055604 | A1* | 2/2014 | Delaney ................ | G01B 11/00 348/135 |
| 2018/0114158 | A1 | 4/2018 | Foubert et al. | |
| 2018/0131907 | A1* | 5/2018 | Schmirler .......... | G05B 23/0216 |
| 2019/0041836 | A1 | 2/2019 | Cella et al. | |
| 2021/0056681 | A1* | 2/2021 | Hyatt ............... | G05B 19/41875 |
| 2021/0365643 | A1 | 11/2021 | Agrawal et al. | |
| 2021/0407548 | A1* | 12/2021 | Ren ..................... | G11B 27/105 |
| 2024/0248963 | A1 | 7/2024 | Parham et al. | |
| 2026/0036969 | A1 | 2/2026 | Linder et al. | |
| 2026/0037304 | A1 | 2/2026 | Linder et al. | |
| 2026/0037566 | A1 | 2/2026 | Linder et al. | |

OTHER PUBLICATIONS

ISA/US, , "PCT Application No. PCT/US24/24827 International Search Report and Written Opinion mailed Sep. 3, 2024", NPL-1 , 15 pages.

* cited by examiner

COMPUTER-ASSISTED CONVERSION OF VIDEO DESCRIPTION OF PROCESS INTO APPLICATION FOR PROCESS CONTROL

RELATED APPLICATIONS

This application is a bypass continuation that claims priority to International Patent App. No. PCT/US24/24827 filed on Apr. 16, 2024, which claims priority to U.S. Prov. App. No. 63/459,656 filed on Apr. 16, 2023, where the entire content of each of the foregoing is hereby incorporated by reference.

TECHNICAL FIELD

This disclosure relates to the use of generative artificial intelligence (AI) to manage and control manufacturing processes.

BACKGROUND

There remains a need for control and management of physical processes such as manufacturing systems using machine learning tools such as generative AI and large language models.

SUMMARY

By converting various data sources and control systems for a manufacturing process into natural language (or near natural language) intermediate representations, inference engines trained on a large corpus of text can be used to generate analysis, recommendations, and solutions based on the full range of domain expertise embodied in the supporting corpus. Other models such as vision models, audio models, and other foundation models, machine learning models, and the like can also be used with other available data to augment solutions based on natural language inference engines.

A computer program product disclosed herein may include computer executable code embodied in a non-transitory computer readable medium that, when executing on one or more computing devices, performs the steps of: converting manufacturing data and application data from a manufacturing process into a near natural language representation including a human-readable description of the manufacturing process, wherein the human-readable description may include at least: explicit metadata from at least one application for the manufacturing process, wherein a text portion of the explicit metadata may be used at least in part as the near natural language representation, implicit metadata for the at least one application, wherein the implicit metadata may include one or more of an inferred type for the at least one application and a programming context for the at least one application, process data from at least one sensor controlled by the application in the manufacturing process, and process metadata for the at least one sensor, the process metadata obtained from one or more of the at least one application and a user description of the at least one sensor, and the process metadata describing a context for the at least one sensor, and the process metadata; requesting a summarization of the human-readable description from a first large language model; and presenting the summarization from the first large language model to a second large language model along with a request for an analysis including an identification of one or more result effective parameters for the manufacturing process.

The computer executable-readable in code may further include code that performs the step of receiving the analysis from the second large language model and presenting the analysis to a user. The first large language model and the second large language model may be a single large language model. The computer executable code may further include code that performs the step of parsing one or more recommendations from the analysis into one or more computer-readable instructions for the manufacturing process. The computer-readable instructions may include code for an application in the manufacturing process. The computer-readable instructions may include code for a machine performing tasks in the manufacturing process. The request may include a prompt to the second language model for computer readable instructions to implement one or more recommendations from the analysis in the manufacturing process. The at least one sensor may include a sensor in a user device. The user device may include one or more of a laptop, a smartphone, a tablet, a desktop computer, or a wearable device.

In another aspect, a method disclosed herein includes converting manufacturing data and application data for a manufacturing process into a near natural language representation including a human-readable description of the manufacturing data, wherein the human-readable description of the manufacturing data may include: explicit metadata from at least one application for the manufacturing process, implicit metadata for the at least one application, process data from at least one sensor in the manufacturing process, and process metadata for the at least one sensor; requesting a summarization of the human-readable description of the manufacturing data from a first language model; and requesting an analysis of the summarization from a second language model.

The first language model and the second language model may be a single large language model. The method may include parsing one or more recommendations from the analysis into one or more computer-readable instructions for the manufacturing process. Requesting the analysis may include requesting computer readable instructions from the second language model for implementing one or more recommendations in the analysis. The at least one sensor may include a user device. The user device may include one or more of a laptop, a smartphone, a tablet, a desktop computer, or a wearable device.

In another aspect, a system disclosed herein includes a manufacturing environment, a data converter, a first configuration module, a second configuration module, and a presentation module. The data converter may be configured to generate a near natural language description of data from the manufacturing environment. The first configuration module may be configured to request a natural language summary of the data from the manufacturing environment by presenting the near natural language description to a first language model. The second configuration module may be configured to receive the natural language summary, and to request a natural language recommendation based on the natural language summary by presenting the natural language summary to a second language model with a request for a recommendation. The presentation module may be configured to receive the natural language recommendation from the second language model, and to parse the recommendation for presentation in a user interface according to one or more user criteria.

The data from the manufacturing environment may include one or more of explicit metadata from at least one application for the manufacturing process, wherein a text portion of the explicit metadata may be used at least in part as the natural language description, implicit metadata for the at least one application, wherein the implicit metadata may include one or more of an inferred type for the at least one application and a programming context for the at least one application, process data from at least one sensor in the manufacturing process, and process metadata for the at least one sensor, the process metadata obtained from one or more of the at least one application and a user description of the at least one sensor, and the process metadata describing a context for the at least one sensor, and the process metadata.

The system may include a user request management module configured to receive a first user selection of the data from the manufacturing environment and the one or more user criteria for creating a prompt for the request. The user request management module may be further configured to receive a second user selection of prompt characteristics for creation of the prompt for the request. The second language model may be refined by training on data for a domain of the manufacturing environment.

In one aspect, a computer program product disclosed herein includes computer executable code embodied in a non-transitory computer readable medium that, when executing on one or more computing devices, performs the steps of: segmenting a plurality of applications controlling a plurality of processes into a number of steps; monitoring execution of the plurality of applications while controlling the plurality of processes, wherein monitoring may include acquiring a timing data distribution for each of the number of steps; training an embedding for a plurality of software modules in the plurality of applications, each of the plurality of software modules associated with one of the number of steps, and each having a step time based on the timing data distribution for the one of the number of steps; receiving an unknown application for a process, the unknown application including a second plurality of software modules; generating step time data for a second number of steps identified for the unknown application based on the embedding; and estimating an execution time for the unknown application based on a combination of the step time data for each of the second number of steps.

The number of steps in the plurality of processes may include one or more steps controlled by the plurality of applications. The number of steps in the plurality of processes may include one or more steps controlled by a user of one of the plurality of applications. The number of steps in at least one of the plurality of processes may include one or more steps having a step time based on manual user steps. The number of steps in at least one of the plurality of processes may include one or more steps having a step time based on a regulation or industry standard. Acquiring the timing data distribution for each of the number of steps in the plurality of processes may include applying a matrix factorization to create a model for a contribution of each step to a total execution time for at least one of the number of steps. Monitoring may include receiving sensor data from one or more sensors controlled by one of the plurality of applications. Monitoring may include receiving sensor data from one or more sensors independent from one of the plurality of applications. The process may be controlled by a plurality of unknown applications, and the computer program product may include code that repeats the steps of generating step time data and estimating the execution time for each of the plurality of unknown applications, thereby obtaining a total execution time estimate for the process. The computer program product may further include code that performs the step of programmatically inferring one or more of the second number of steps based on a program flow of the second plurality of software modules. The computer program product may further include code that performs the step of programmatically inferring one or more of the second number of steps based on user inputs to the second plurality of software modules.

In one aspect, a method disclosed herein includes monitoring execution of a plurality of applications controlling a plurality of processes, wherein monitoring may include acquiring timing data for each of a number of steps in the plurality of processes; creating an execution model for each of the number of steps including a descriptor for each of the number of steps as performed in each of the plurality of processes, the execution model including timing data and an embedding for each of the number of steps in the plurality of processes; receiving an application, the application configured to perform a process; generating a process time estimate for the application based on the execution model.

Creating the execution model may include creating the embedding for the plurality of applications based on one or more software modules in the plurality of applications and the timing data measured for each of the one or more software modules in the plurality of applications. Creating the execution model may include creating a regression model that relates a total process time for each of the plurality of applications to the timing data for each of the number of steps. The descriptor may include a distribution of time values for each of the number of steps. The number of steps in the plurality of processes may include one or more steps controlled by one of the plurality of applications. The number of steps in the plurality of processes may include one or more steps controlled by a user of one of the plurality of applications. The number of steps may include one or more steps having a timing expectation based on manual user steps. The method may include inferring one or more of the number of steps in the process based on a programmatic analysis of the application.

In another aspect, a system disclosed herein includes a database storing an execution model for process steps in industrial processes, wherein the execution model may include an embedding for a first plurality of software modules and associated step times measured for each of the first plurality of software modules while controlling one or more of the industrial processes; an execution time estimation module configured to: receive an application, parse the application into a second plurality of software modules, map the second plurality of software modules to the first plurality of software modules based on the embedding, apply the execution model to derive timing descriptions for one or more steps in the application, and combine the timing descriptions to obtain a total execution time for the application; and a user interface configured to receive a submission of the application from a user and to display the estimated process time for the application to the user.

In another aspect, there is disclosed herein a computer program product comprising computer executable code embodied in a non-transitory computer readable medium that, when executing on one or more computing devices, performs the steps of: receiving a plurality of representations of a plurality of applications, the plurality of representations in a text-based format; converting the plurality of representations into a plurality of corresponding descriptions with a pre-trained generative model; creating a classification engine trained to identify a type of an unknown application, wherein the classification engine configured using a first embedding based on features of the plurality of corresponding descriptions from the plurality of representations in the text-based format and a second embedding based on features from a plurality of supplemental descriptions of the plurality of applications; receiving an application; converting a representation of the application into a description in the text-based format; receiving a supplemental description for the application; and providing a classification for the application by classifying the application with the classification engine based on the description and the supplemental description.

Converting the plurality of representations into a plurality of corresponding descriptions may include submitting at least one of the plurality of representations to the pre-trained generative model with a prompt to generate a text-based summary. The pre-trained generative model may include a large language model. The plurality of corresponding descriptions may include text-based summaries generated by a large language model. The plurality of corresponding descriptions may include one or more of near natural language descriptions, visual representations, and programmatic representations. The plurality of representations may include JSON application definitions. The plurality of representations may include one or more of XML descriptions and YAML descriptions. The plurality of supplemental descriptions may include at least one of an audio, a video, a screen shot, a user manual, a text description, an image, and a code segment, and a schema. The supplemental description of the application may include a screen shot captured during execution of the application. The classification engine may be configured using unsupervised clustering. The computer program product may include code that performs the step of displaying the classification to a user. The computer program product may include code that performs the step of applying a policy to the second application based on the classification.

In another aspect, there is disclosed herein a method including converting a plurality of applications into a plurality of descriptions with a pre-trained generative model; creating a classification engine trained to identify a type of an unknown application, the classification engine configured using a first embedding based on features of the plurality of descriptions and a second embedding based on features from a plurality of supplemental descriptions of the plurality of applications; receiving an application; converting a representation of the application into a description; receiving a supplemental description for the application; and providing a classification for the application by classifying the application with the classification engine based on the description and the supplemental description.

Converting the plurality of applications into the plurality of descriptions with the pre-trained generative model may include submitting at least one of the plurality of applications to the pre-trained generative model with a prompt to generate a text-based summary. Converting the plurality of applications into the plurality of descriptions with the pre-trained generative model may include identifying a text-based representation for at least one of the plurality of applications and submitting the text-based representation to the pre-trained generative model for summarization in a natural language format. The pre-trained generative model may include a large language model. The plurality of representations may include at least one of a JSON application definition, an XML description, and a YAML description. The plurality of supplemental descriptions may include at least one of an audio, a video, a screen shot, a user manual, a text description, an image, and a code segment, and a schema. The supplemental description of the application may include at least one of a screen shot for the application and a user interface description for the application.

In another aspect, there is disclosed herein a system comprising a memory storing a classification engine, and one or more processors. The classification engine may be configured using a first embedding based on features of a plurality of text-based descriptions generated by a large language model for a plurality of applications. The classification engine may be configured using a second embedding based on a plurality of supplemental descriptions for the plurality of applications, the plurality of supplemental descriptions including a plurality of screenshot captured during execution of the plurality of applications. The classification engine may be trained to identify a type of one of the plurality of applications. The one or more processors may be configured by computer executable code to perform the steps of: receiving a submission of an unknown application in a user interface, obtaining a first text-based description for the unknown application with the large language model, submitting the first text-based description and a first screenshot for the unknown application to the classification engine, and displaying a result for the unknown application from the classification engine to the user, the result including the type of the unknown application.

In another aspect, there is disclosed herein a computer program product comprising computer executable code embodied in a non-transitory computer readable medium that, when executing on one or more computing devices, performs the steps of: receiving a video of a manufacturing process, the video including a visual recording of the manufacturing process and an audio recording of a concurrent narration by a user during the manufacturing process; parsing the video into a plurality of segments for each of a plurality of specific actions in the manufacturing process using computer vision; creating a description of the manufacturing process with a first language model, the description including a step description for each of the plurality of segments based on the video recording and the audio recording; transforming the description of the manufacturing process into an intermediate representation using a summary and analysis of the description from a second language model; transforming the intermediate representation into a machine readable description that expresses programming logic for the manufacturing process based on a structure of the manufacturing process contained in the intermediate representation; and converting the machine readable description into executable code for an application to control the manufacturing process using one or more no-code or low-code tools.

The video of the manufacturing process may include one or more mistakes during execution of the manufacturing process. The audio recording may include a narrative description of the one or more mistakes. One or more of the plurality of segments may include a quality control step. Parsing the video into the plurality of segments may include parsing the video based on one or more keyframe detections correlated to user actions. The intermediate representation may include pseudo-code. The intermediate representation may include one or more of a flowchart, a list of instructions, and a text description. Transforming the intermediate representation into the application may include converting one or more forks into the manufacturing process into user inputs. Transforming the intermediate representation into the application may include converting one or more data collection steps into input steps. The computer program product may include code that performs the steps of deploying the application and monitoring a process flow of the application to ensure that the manufacturing process may be proceeding according to the video description.

In another aspect, there is disclosed herein a method that includes receiving a video of a manufacturing process including one or more process steps; parsing the video into a plurality of specific actions in the manufacturing process using computer vision to obtain feature data including a description of the manufacturing process; transforming the feature data into an intermediate representation using a summary and analysis from an inference engine; transforming the intermediate representation into a machine readable description that expresses programming logic based on a structure of the manufacturing process in the video; and converting the machine readable description into data for an application to control the manufacturing process.

The data may include one or more of computer executable code for the application, text, an image, a user interface layout, a connector, a library, a video segment, an audio segment, and a help library for supporting the manufacturing process. The video may include a spoken narration of the manufacturing process. The video may include extracting a natural language description of the manufacturing process from the spoken narration. The one or more process steps may include one or more mistakes during execution of the manufacturing process. The one or more process steps may include one or more quality control steps. Transforming the feature data into the intermediate representation using the summary and analysis from the inference engine may include supplementing the feature data with supplemental descriptive materials to the inference engine, the supplemental descriptive materials include one or more of a flow chart, a user manual, and a text description for the manufacturing process. The inference engine may include at least one of a visual language model, an audio language model, and a large language model. The feature data may include one or more of an action segment, a keyframe detection correlated to the action segment, and a natural language action description correlated to the action segment.

In another aspect, there is disclosed herein a system including a manufacturing environment configured to perform a manufacturing process, a recording device configured to acquire a video including a visual recording of the manufacturing process and an audio recording of a concurrent narration by a user during the manufacturing process; a memory storing the video; and an application generator configured to generate an application to control the manufacturing process by performing the steps of: parsing the video into a plurality of segments for each of a plurality of specific actions in the manufacturing process using computer vision, creating a description of the manufacturing process with a first inference engine, the description including a step description for each of the plurality of segments based on the video recording and the audio recording, transforming the description of the manufacturing process into an intermediate representation using a summary and analysis of the description from a second inference engine, transforming the intermediate representation into a machine readable description that expresses programming logic for the manufacturing process based on a structure of the manufacturing process contained in the intermediate representation, and converting the machine readable description into executable code for the application to control the manufacturing process.

In one aspect, a computer program product disclosed herein may include computer executable code embodied in a non-transitory computer readable medium that, when executing on one or more computing devices, performs the steps of: converting an application for a manufacturing process into an intermediate representation in near natural language form; requesting a description of the application from a first large language model based on the intermediate representation; receiving one or more validation rules for the manufacturing process based on at least one of a regulation, an industry standard, and a customer requirement; presenting the description of the application and the one or more validation rules to a second large language model along with a request for an evaluation of whether the manufacturing process consistently satisfies the one or more validation rules; and presenting a result for the evaluation as a validation report in human readable form.

Requesting the description of the application may include requesting a classification of the application from a classification engine. Receiving the one or more validation rules may include providing the one or more validation rules to a second large language model with a request for a natural language description. The computer program product may include code that performs the step of prompting the second large language model to specify one or more additional sensors recommended for the manufacturing process to satisfy the one or more validation rules. The computer program product may include code that performs the step of prompting the second large language model to specify one or more human touch points for inspection recommended for the manufacturing process to satisfy the one or more validation rules. Requesting the description of the application may include providing the first large language model with supplemental descriptive data for the application. The supplemental descriptive data may include a screenshot of a user interface acquired during execution of the application. The supplemental descriptive data may include one or more of a user interface for the application, a user manual for the application, a video captured during the manufacturing process, and a text summary of the application.

In another aspect, a method disclosed herein includes receiving a description of an application for a manufacturing process; receiving one or more validation rules for the manufacturing process; requesting a validation report from an inference engine by presenting the description of the application and the one or more validation rules to the inference engine along with a request for an evaluation of whether the manufacturing process consistently satisfies the one or more validation rules; and presenting the validation report to a user.

Requesting the description of the application may include requesting a classification of the application from a classification engine. The inference engine may include a large language model. The validation report may include requesting documentation from the inference engine of how the application satisfies each of the one or more validation rules. The one or more validation rules may include receiving validation documentation including at least one of a regulation applicable to the manufacturing process, an industry standard applicable to the manufacturing process, and a customer requirement applicable to the manufacturing process, and requesting a summary of the validation documentation from an inference engine. Requesting the validation report may include requesting machine readable code to modify the application to satisfy the one or more validation rules. Requesting the validation report may include providing the inference engine with a sensor description characterizing one or more sensors available to the application during the manufacturing process, and requesting a description of how the one or more sensors can be used to satisfy the one or more validation rules. Requesting the validation report may include prompting the inference engine to specify one or more sensors recommended for the application to satisfy the one or more validation rules. The one or more validation rules may include one or more steps to be required during the manufacturing process. Receiving the description of the application may include providing a second inference engine with supplemental descriptive data for the application along with a request for the description in a near natural language form. The supplemental descriptive data may include one or more of a user interface for the application, a user manual for the application, a video captured during the manufacturing process, a screen shot captured while the application is executing, a user interface layout for the application, a code segment for the application, and a text summary of the application.

In another aspect, there is disclosed herein a system including a manufacturing process controlled by an application; a text description of one or more validation requirements for the manufacturing process; and a test plan generation module configured to perform the steps of: requesting a description of the application from a first large language model, and requesting a validation report from a second inference engine, the validation report including a human readable description of how the application satisfies the one or more validation requirements for the manufacturing process based on the description of the application and the text description of the one or more validation requirements.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DESCRIPTION

Figure 1:
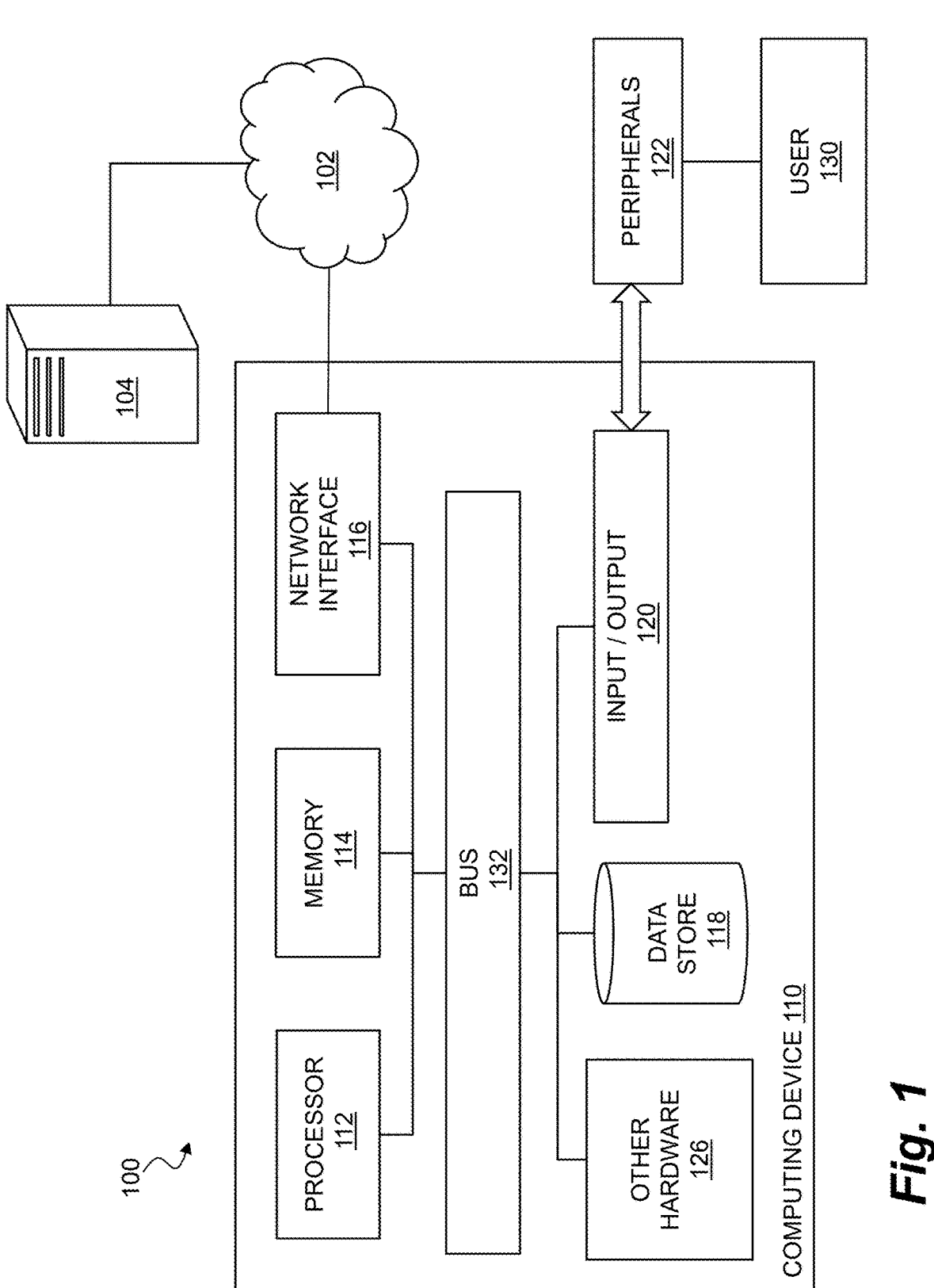
FIG. 1 shows a computing device for use in the methods and systems described herein.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better describe the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

To provide an overall understanding of the disclosure, certain illustrative implementations will now be described, including systems, methods, and devices for using generative AI and other machine learning techniques to improve the management and control of manufacturing systems and processes. However, it will be understood by one of ordinary skill in the art that the systems and methods described herein may be adapted and modified as is appropriate for use in other environments where data for computer-controlled, physical steps or processes can be captured and used to generate in embeddings, network layers, transformers, coder/decoders, foundation models, or other machine learning representations that encode semantic relationships, similarities, or other underlying structures or relationships of the data. Any such adaptations or modifications are intended to fall within the scope of this disclosure. Generally, the computerized systems described herein may comprise one or more engines, platforms, modules, compute instances, or the like, which may include a processing device or devices, such as computers, microprocessors, logic devices, and/or other devices or processors that are configured with hardware, firmware, and/or software (e.g., stored in a non-transitory computer readable medium) to carry out one or more of the computerized methods described herein.

FIG. 1 is a diagram of a computer system 100 for use in the methods and systems described herein. In general, the computer system 100 of FIG. 1 may be used to implement a website, a central computing platform, a transaction engine, a software module, a machine learning model, a data store or other external data source, or any of the other platforms, processes, entities, or computing devices or the like described herein. The computer system 100 may also or instead be configured by computer executable code stored in a memory and executable by one or more processors to perform steps of the methods and processes described herein.

The computer system 100 may include a computing device 110, and may be connected through a network 102 to an external device 104. The computing device 110 may be or may include any type of computing device or compute instance suitable for use as described herein. For example, the computing device 110 may include a desktop computer workstation. The computing device 110 may also or instead be any other device that has a processor and other hardware, including without limitation a laptop computer, a desktop computer, a personal digital assistant, a tablet, a mobile phone, a television, a set top box, a wearable computer, and so forth. The computing device 110 may also or instead include a server, or it may be disposed on a server or within a virtual or physical server farm. In certain aspects, the computing device 110 may be implemented using hardware (e.g., in a desktop computer), software (e.g., in a virtual machine or the like), or a combination of software and hardware (e.g., with programs executing on the desktop computer). The computing device 110 may be a standalone device, a device integrated into another entity or device, a platform distributed across multiple entities, or a virtualized device executing in a virtualization environment.

The network 102 may include any network or combination of networks, such as one or more data networks or internetworks suitable for communicating data and control information among participants in the computer system 100. The network 102 may include public networks such as the Internet, private networks, and telecommunications networks such as the Public Switched Telephone Network or cellular networks using third generation cellular technology (e.g., 3G or IMT-2000), fourth/fifth generation cellular technology (e.g., 4G, LTE, MT-Advanced, E-UTRA, 5G, etc.) or WiMax-Advanced (IEEE 1002.16m)) and/or other technologies, as well as any of a variety of corporate area, metropolitan area, campus, or other local area networks or enterprise networks, along with any switches, routers, hubs, gateways, and the like that might be used to carry data among participants in the computer system 100. The network 102 may also include a combination of data networks, and need not be strictly limited to a particular public network or a particular private network.

The external device 104 may be any computer or other remote resource that connects to the computing device 110 through the network 102. This may include administrative resources for a manufacturing facility, machine learning resources, databases, servers, and so forth, as well as gateways or other network devices for connecting to remote servers for content or services requested by the computing device 110. The external device 104 may also or instead include a network storage device, a database, a data store, a data warehouse, a cloud storage facility, a content host, or any other data storage resource or the like that the computing device 110 might usefully connect to through the network 102, e.g., for storage and retrieval of data.

The computing device 110 may include a processor 112, a memory 114, a network interface 116, a data store 118, and one or more input/output interfaces 120. The computing device 110 may further include or be in communication with one or more peripherals 122 such as external input/output devices.

The processor 112 may be any as described herein, such as a central processing unit, graphics processing unit, microprocessor, multi-core processor, digital signal processor, application-specific integrated circuit, and/or other processing hardware, or virtualized version of same. In general, the processor 112 may be capable of processing instructions for execution within the computing device 110 or computer system 100. In one aspect, the processor 112 may be capable of processing instructions stored in the memory 114 or in the data store 118.

The memory 114 may store information within the computing device 110 or computer system 100. The memory 114 may include any non-transitory computer readable medium, such as a volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 114 may store program instructions, program data, executables, and other software and data useful for controlling operation of the computing device 110, and for configuring the computing device 110 to perform functions for a user. While the memory 114 is depicted as a single memory, it will be understood that any number of memories may be usefully incorporated into the computing device 110. For example, a first memory may include memory on the processor, which may store, e.g., a current execution pipeline or the like, a second memory that provides additional working memory for instructions and data used by the processor 112 (such as external RAM or the like), and a third memory including non-volatile storage such as a disk drive for permanent or long-term storage of files and code even when the computing device 110 is powered down.

The network interface 116 may include any hardware and/or software for connecting the computing device 110 in a communicating relationship with other resources through the network 102. This may include connections to resources such as remote resources accessible through the Internet, as well as local resources available using short range communications protocols using physical connections (e.g., Ethernet), radio frequency communications (e.g., WiFi or Bluetooth), optical communications, (e.g., fiber optics, infrared, or the like), ultrasonic communications, or any combination of these or other media that might be used to carry data between the computing device 110 and other devices. The network interface 116 may, for example, include a router, a modem, a network card, an infrared transceiver, a radio frequency (RF) transceiver, a near field communications interface, a radio-frequency identification (RFID) tag reader, or any other resource for reading or writing data. More generally, the network interface 116 may include any combination of hardware and software suitable for coupling the components of the computing device 110 to other platforms, computing resource, communications resources, and so forth.

The data store 118 may be any internal memory store providing a computer-readable medium such as a disk drive, an optical drive, a magnetic drive, a flash drive, memory card, or other device capable of providing mass storage and or non-volatile storage for the computing device 110. The data store 118 may store computer readable instructions, data structures, program modules, and other data for the computing device 110 or computer system 100 in a non-volatile form for subsequent retrieval and use. The data store 118 may store computer executable code for an operating system, application programs, and other program modules, software objects, libraries, executables, and the like. The data store 118 may also store program data, databases, files, media, and so forth. In one aspect, the data store 118 may be a removable data store that is removably and replaceably coupled to the computing device 110.

The input/output interface 120 may support input from and output to other devices that might couple to the computing device 110. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices.

The peripherals 122 may include any device or combination of devices used to provide information to or receive information from the computing device 110. This may include human input/output (I/O) devices such as a keyboard, a mouse, a mouse pad, a trackball, a joystick, a microphone, a foot pedal, a camera, a touch screen, a scanner, or other device that might be employed by the user 130 to provide input to the computing device 110. This may also or instead include a display, a speaker, a printer, a projector, a headset, a virtual reality or augmented reality display device, or any other audiovisual device for presenting information to a user or otherwise providing machine-usable or human-usable output from the computing device 110. The peripheral 122 may also or instead include digital signal processing hardware, communications hardware, sensors, actuators, and/or other components to couple the computing device 110 to a surrounding context, and/or to support control of or communication with other devices or components.

Other hardware 126 may be incorporated into the computing device 110 such as a co-processor, a digital signal processing system, a math coprocessor, a graphics engine, a video driver, and so forth. The other hardware 126 may also or instead include expanded input/output ports, extra memory, additional drives (e.g., a DVD drive or other accessory), and so forth.

A bus 132 or combination of busses may serve as an electromechanical platform for interconnecting components of the computing device 110 such as the processor 112, memory 114, network interface 116, other hardware 126, data store 118, and input/output interface 120. As shown in the figure, each of the components of the computing device 110 may be interconnected using a system bus 132 or other communication mechanism for communicating information therebetween.

Methods and systems described herein can be realized using the processor 112 of the computer system 100 to execute one or more sequences of instructions contained in the memory 114 to perform predetermined tasks. In embodiments, the computing device 110 may be deployed as a number of parallel processors synchronized to execute code together for improved performance, or the computing device 110 may be realized as a virtual machine in a virtualized environment where a hypervisor or other virtualization management facility emulates components of the computing device 110 as appropriate to reproduce some or all of the functions of a hardware instantiation of the computing device 110.

Figure 2:
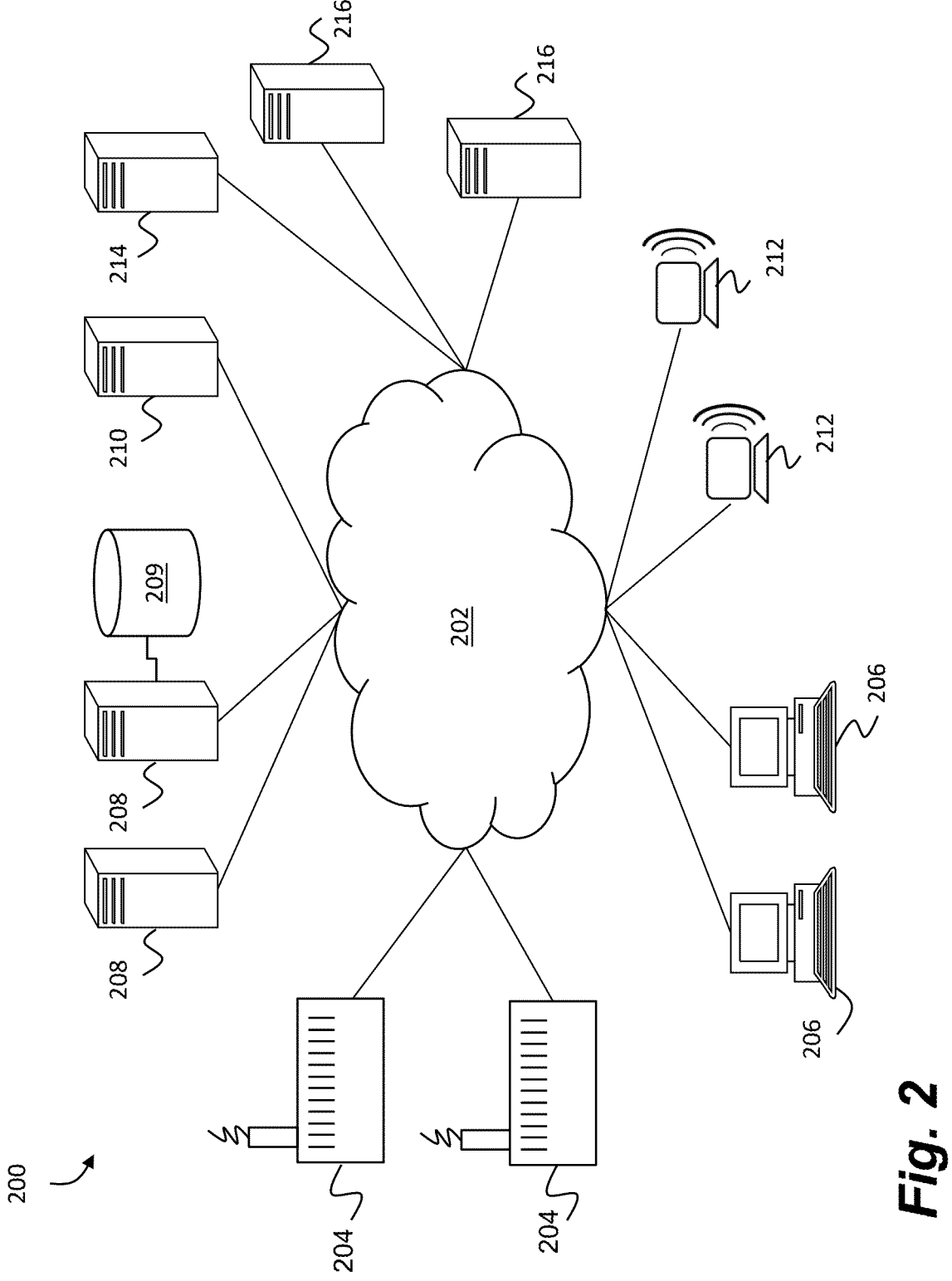
FIG. 2 shows a networked environment for managing physical processes such as manufacturing.

FIG. 2 shows a networked environment for managing physical processes such as a manufacturing process. In general, the manufacturing environment 200 may include a data network 202 interconnecting a plurality of participating devices in a communicating relationship. The participating devices may include or be deployed on any of the computing devices or other resources described herein, and may, for example, include any number of facilities 204 such as manufacturing or production plants, assembly lines, inspection lines, client devices 206, servers 208 (e.g., with associated data stores 209), content sources 210, mobile devices 212, and other resources 216.

The data network 202 may be any network(s) or inter-network(s) suitable for communicating data and control information among participants in the manufacturing environment 200. This may include public networks such as the Internet, private networks, telecommunications networks such as the Public Switched Telephone Network or cellular networks using third generation (e.g., 2G or IMT-2000), fourth generation (e.g., LTE (E-UTRA), fifth generation, or WiMax-Advanced (IEEE 1002.16m), as well as any of a variety of corporate area or local area networks and other switches, routers, hubs, gateways, and the like that might be used to carry data among participants in the manufacturing environment 200, and/or any other networks described herein.

A facility 204 may include any physical plant associated with physical processes, such as a plant for processing raw materials, manufacturing, assembly, finishing, inspection, or the like. This may, for example, include a manufacturing plant, a chemical plant, an assembly line, a warehouse or distribution center, a power plant, a food processing plant, an oil refinery, a steel mill or other metals-processing facility, a raw materials mine, a water treatment plant, a wastewater treatment plant, a research and development facility, and so forth. Each facility 204 may, for example, include a building or group of buildings and the like, along with machines, sensors, actuators, workstations, supervisory stations, and the like. The workstations may, for example, provide user interfaces for providing information to human users and receiving input from human users, along with any suitable combination of sensors, actuators, machinery, and the like for performing manufacturing tasks, along with one or more computing devices such as any of the those described herein for integrating operation of the workstation hardware into a manufacturing process, providing instructions to a human user, receiving input or inquiries from the human user, and so forth. The workstation may, for example, use one or more applications for coordinating activity at the workstation, such as workstations using any of the applications or application authoring tools described, by way of non-limiting example, in U.S. Pat. No. 10,1096,860, the entire content of which is hereby incorporated by reference. Each facility 204 may include local monitoring systems including sensors, management systems, and the like, and may include one or more connections to the data network 202 for transceiving data and control information.

As used herein, the term "application" may refer generally to any software program(s), computer executable code, code segments, software modules, or the like configured to perform a task or set of tasks. An application may include a standalone executable application suitable for execution in an operating system environment, a containerized application suitable for execution in another software container or environment, a virtualized application executing in a virtualized environment, script or byte code for execution in an interpreter or other execution environment or platform, or any suitable combination of these. An application may run on a variety of computing devices, such as any of the computing devices described herein, and may include a user interface, such as a graphical user interface, for human interaction, along with one or more connectors for connecting to other computing objects, devices, resources, and the like. Applications may be written in various programming languages such as Java, C++, Python, and Swift, and may generally be compiled, interpreted, or otherwise processed for execution to perform programmed tasks. An application may also be linked to libraries, remote data resources, or other resources to support execution of the application. In another aspect, an application may include a collection of programs, processes, and so forth that operate in combination. In general, an application may include a user interface components such as a graphical user interface, a voice interface, or other user interface to facilitate user interactions with application-supported tasks.

In one aspect, an application may be an application designed to run on devices or systems located at the edge of a network, e.g., closer to the manufacturing resources and end-users of a manufacturing facility. This can advantageously bring computing resources closer to managed devices and processes in order to reduce latency and improve overall performance. In one aspect, applications facilitate real-time decision-making for effective control of time-sensitive processes. In another aspect, an application may be, or may include, a distributed application that executes on a network of distributed computers, with data and processing distributed across multiple nodes, machines, or containers, rather than being centralized at a single physical location. As a significant advantage, distributed applications are typically scalable and fault tolerant, and can continue to function even when some nodes on a network fail. In another aspect, an application may be a hybrid application using edge components, software-as-a-service components, cloud computing infrastructure, virtualized compute instances, distributed components, and the like, either alone or in any suitable combination. In general, an application as used herein is intended to refer to any of the foregoing, unless a different meaning is explicitly provided or otherwise clear from the context.

Client devices 206 may be devices within the manufacturing environment 200 operated by users to interact with other elements of the manufacturing environment 200. This may include desktop computers, laptop computers, network computers, tablets, or any other computing device that can participate in the manufacturing environment 200 as described herein, including computing devices at workstations at a facility 204 (which may host applications for a manufacturing line or the like) and/or remote computing devices operated by various users outside the network environment of a facility 204. Each client device 206 generally includes a user interface such as a graphical user interface, command line interface, or other user interface for user interaction with a facility 204 and other network resources. In embodiments, the user interface may be remotely served and presented on one of the client devices 206, such as where another resource includes a web server that presents one or more web pages or the like that can be displayed within a web browser or similar client executing on one of the client devices 206.

The servers 208 may include data storage, a network interface, and a processor or other processing circuitry. The servers 208 may support various functions contemplated herein. This may, for example, include storing process data for one of the facilities 204, providing tools for authoring, monitoring, or deploying applications to one of the facilities 204, hosting remotely accessible services such as communications platforms (e.g., email, messaging), productivity tools, data storage, and the like for users associated with one of the facilities 204, and so forth.

The content sources 210 may include any sources of content for use in the methods and systems described herein. This may, for example, include industry data, manufacturing specifications and standards, user guides, code repositories, device specifications, customer requirements, databases, collaborative resources, inventory or price data, and so forth.

The web servers 214 may provide web-based access to and from any of the other participants or resources in the manufacturing environment 200. While depicted as a separate network entity, it will be appreciated that a web server 214 may be logically or physically associated with one of the other network elements described herein, and may, for example, provide a user interface for web access to one of the servers 208, the content sources 210, the facilities 204, and so forth in a manner that permits user interaction through the data network 202, e.g., from a client device 206 or mobile device 212.

The mobile devices 212 may be any form of mobile device, such as any wireless, battery-powered device, that might be used to interact with the networked manufacturing environment 200. The mobile devices 212 may, for example, include laptop computers, tablets, thin client network computers, portable digital assistants, messaging devices, cellular phones, smart phones, portable media or entertainment devices, and so forth. In general, mobile devices 212 may be operated by users for a variety of production-oriented functions such as monitoring manufacturing activity at the facilities 204, receiving notifications or alerts, and the like.

The other resources 216 may include any other software or hardware resources that may be usefully employed in the systems and methods described herein. For example, the other resources 216 may include, e.g., payment processing servers or platforms used to authorize payments, third party services providing data or computing resources, identity management platforms, certificate authorities, domain name services, and the like. In another aspect, the other resources 216 may include a cloud computing platform, cloud-based data storage, virtualization platform, or other resource or combination of computing resources suitable for providing a networked computing platform for the systems and methods described herein.

In one aspect, the other resources 216 may include an inference engine that uses, e.g., generative artificial intelligence (or generative AI) to create new content based on a corpus of training data. The term "generative AI," as used herein, refers to artificial intelligence technologies that have the capability to generate new content, including text, images, video, program code, and the like. Generative AI technologies use machine learning models such as deep learning networks to analyze vast amounts of data, based upon which they can learn patterns, styles, or rules, or otherwise encode knowledge contained in the training data, and then use this training to generate new content, e.g., using transformers or other coder/decoders, that is similar to the training data. Some well-known examples of generative AI technologies include Generative Adversarial Networks (GANs) and Transformers. GANs use two neural networks, a generator and a discriminator, to concurrently produce and evaluate new content to achieve highly realistic outputs (relative to the training data). Transformers have been successful in natural language processing tasks, and can generate coherent and contextually relevant text based on a prompt.

An inference engine may be supported by a model for generative AI, such as a large language model trained on large amounts of natural language data, e.g., a large corpus of natural language documents containing text, to generate human-like responses to prompts. These large language models use machine learning techniques such as deep neural networks to learn patterns and structures in language data, which they can then use to generate new text that is similar in style and content to the training data. Large language models have become increasingly popular in recent years due to their ability to perform a range of natural language processing tasks, such as language translation, text summarization, and question-answering. They have also been used in chatbots and virtual assistants, where they can understand and respond to human language input in a natural and conversational way. As a significant advantage, these models can encode and benefit from broad knowledge bases and expertise in various domains on which the model was trained, and may provide a natural language or other intuitive interface for user interactions.

One well-known example of a large language model is OpenAI's GPT-3 (or GPT-3.5, GPT-3.5 Turbo, GPT-4, GPT-4 Turbo), which has been trained on a massive corpus of text data and has achieved impressive performance on a wide range of natural language tasks. This model (or later generations, such as GPT-5) may be used to provide recommendations drawing on the range of information and expertise in the training data. Such a model may also be fine-tuned using specific user data (such as data specific to an industry or company using the model to generate analysis and recommendations), or a new large language model may be created specifically for a particular industrial or commercial application. Other commercially available large language models such as Gemini, LlaMA, Falcon, Cohere, PaLM, and Claude v1 can also or instead support an inference engine that provides natural language generative AI.

An inference engine may also or instead use other models to support generative AI. For example, generative AI models have been created for tasks such as generating images in response to natural language prompts, generating computer code in response to prompts, converting text into spoken audio, converting audio into text, converting text into numerical form, converting images into text, and so forth. These inference engines may usefully be employed to support and control manufacturing processes as more generally described herein. It will be understood that the inference engine may also or instead employ other machine learning and/or analytical techniques to perform analysis and make recommendations based on manufacturing data and other available data sources.

In one aspect, an inference engine based on generative AI can be used to create recommendations by analyzing patterns and similarities in user-provided datasets of behaviors or preferences, and then generating new recommendations based on that analysis. For example, generative AI may be used with user-provided data and a large language model to provide summarization, outlining, information extraction, information expansion (e.g., prompted content creation), recommendations, translation, rephrasing, sentiment analysis, coding, text to programmatic commands, code to natural language, natural language to database query (e.g., SQL), classification, grammar correction, conversational interaction (e.g., for chatbots or the like), and so forth. Generative AI can be used, for example, to analyze patterns in user behavior data to generate new recommendations based on what users have done in the past. In another aspect, generative AI can employ content-based filtering, which involves analyzing the characteristics of items to make recommendations that a user may find helpful. In this context, generative AI can be used to analyze manufacturing data, user actions, and so forth to generate new recommendations for operating a manufacturing line or the like based on similarities to other manufacturing processes. A hybrid approach may also be used, where recommendations combine collaborative filtering and content-based filtering to make recommendations. More generally, generative AI can be used to analyze user behavior data, instrumentation or other process data, productivity and results, and to generate new recommendations, tools, analysis, and the like based in response to input data and any accompanying prompts, requests, analysis parameters, or the like.

More generally, a variety of techniques may be used to adapt inferencing based on machine learning for use in a manufacturing context. In one aspect, custom foundation models may be trained for coding tasks, e.g., based on audio, video, sensor data, program code, user manuals, execution logs, process specifications, and so forth. While this approach can be used to create a neural network or the like can identify patterns or structures in the source manufacturing process data, unsupervised model training in this context is also computationally expensive, and tends to perform better with very large training data sets. As such other techniques may also or instead be used to incorporate pre-trained models, which can be refined or deployed to work with domain-specific data for, e.g., a hardware/software/process environment for a manufacturing process.

For example, in one aspect, existing pre-trained models may be used sequentially or iteratively to prepare manufacturing data for use with existing foundation models, for example, by initially requesting a data summary, and then presenting this summary along with a specific request for analysis or recommendations.

In another aspect, embeddings may be trained and used as an input layers for other foundation models in order to reduce dimensionality and identify relevant features for use with other models. In another aspect, other input processing may be used, either alone or in combination with other embedding(s) to support a multi-model head end for a generative AI system. For example, for a system that can receive video data, text, and program code, this may include a convolutional neural network or other structure to extract spatial features, objects, activities, keyframes, segments, and timing from a video stream, along with an embedding trained to convert application code into a text description optimized for use with a pre-trained large language model. By fusing these heterogenous data types into a unified representation, a suitable latent space can then be configured for creating a decoder or generator network that can create new application code based on multi-modal process descriptions.

In another aspect, a variety of prompt engineering and other augmentation techniques may be used to improve results from a foundation model that was not trained with a domain specific data set. For example, this may include retrieving current (i.e., non-training) data or other descriptive text and the like from a manufacturing process to augment a request from an inference engine, and/or augmenting model outputs by retrieving process-specific data relevant to one or more portions of the generative output.

More generally, a variety of techniques may be used to constrain a generative AI analysis or coding task to a particular manufacturing domain or process in order to facilitate the creation of useful results without requiring a full custom foundation model for, e.g., coding manufacturing applications.

Figure 3:
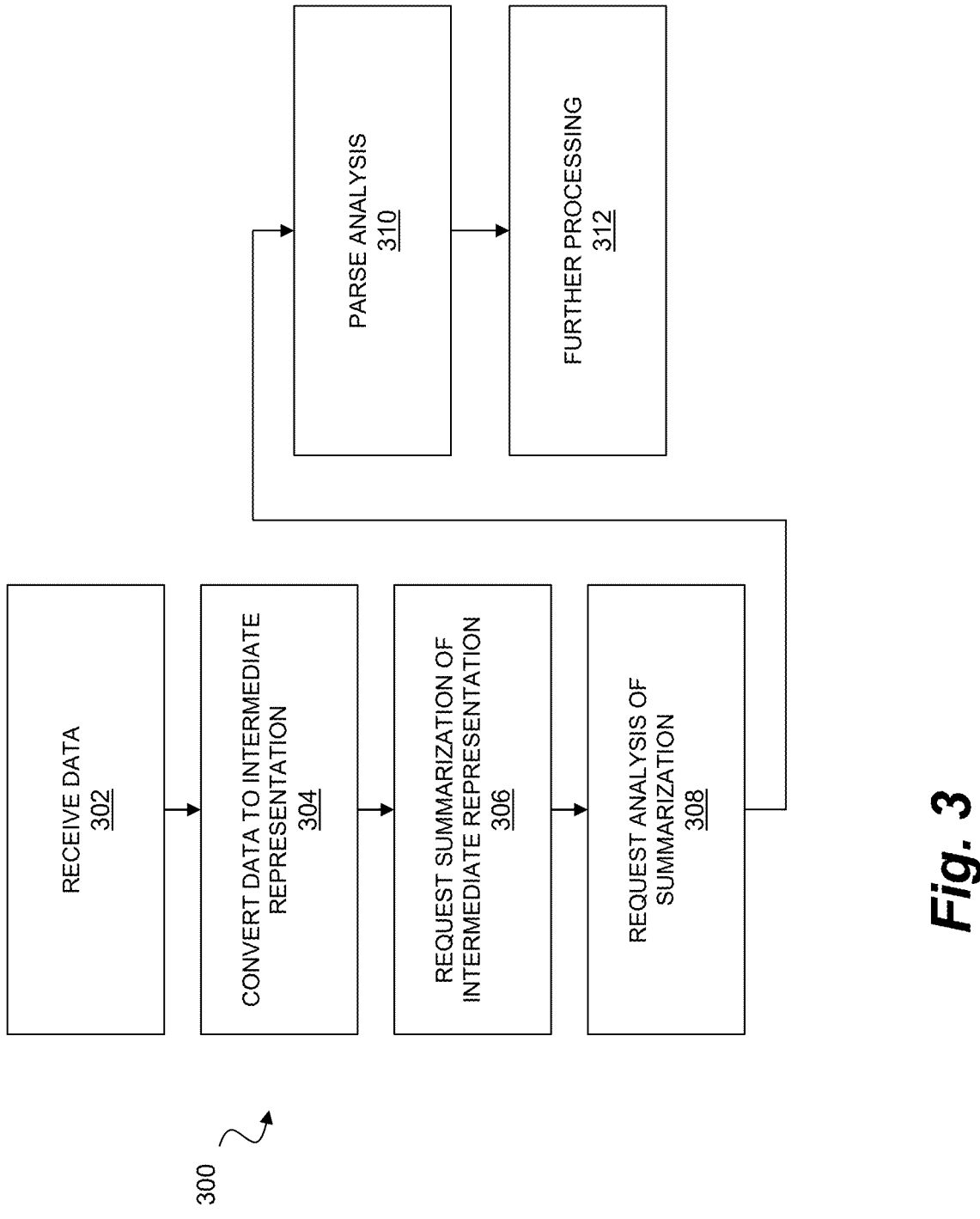
FIG. 3 shows a method for generating recommendations for a manufacturing process using generative AI.

FIG. 3 shows a method for generating recommendations for a manufacturing process using generative AI. Data from manufacturing is highly uncontextualized and siloed, requiring expert knowledge of context and substantial data preprocessing to support meaningful queries and visualizations. To address this problem, data for a number of different sources in a manufacturing environment can be retrieved and converted into an intermediate representation in a natural language or near natural language form, which can in turn be ingested by a generative AI engine using a pretrained model such as a large language model, along with suitable prompts by the user to summarize, analyze, and make recommendations based on the data. The method disclosed herein may generally include converting a range of data for a manufacturing process into a form that can be ingested by a generative AI engine, and providing suitable prompts to the generative AI engine to summarize, analyze, and make recommendations based on the data.

As shown in step 302, the method 300 may include receiving data such as manufacturing data from a manufacturing system or other process, facility or the like. The manufacturing data may include sensor data, programming data, metadata, contextual data, user data, and so forth. For example, this may include sensor data from individual sensors within a manufacturing facility, which data may be acquired and stored locally on devices within the facility for retrieval, or streamed to a local, facility-wide, or global data store. The data may also or instead include audio recording, video recording, user inputs, and so forth. In another aspect, the manufacturing data may include code, logs from executing applications, execution errors, and so forth. In another aspect, the data may include data from stand-alone devices that can be used to monitor the process or receive user inputs such as smartphones, audio recording devices, cameras, or the like. The data may also or instead include data from user devices such as personal computing devices operated by users in the manufacturing environment. Any such data (e.g., from user devices) can be shared by a user with a data store for the manufacturing facility, or a user device may be registered to automatically upload predetermined data to the data store, either at predetermined intervals, or in response to a trigger such as completion of a process. In general, a user device may include a laptop, a desktop, a tablet, a smart phone, a desktop computer, or the like that may be operated by a user in a manufacturing environment. The user device may also or instead include a wearable device such as a smart watch, augmented reality glasses, virtual reality glasses, a wearable ring, or other wearable computing device. The manufacturing data may also include third party data, such as data from vendors (e.g., specifications for inventory, raw materials, and the like received at the manufacturing facility) or industry groups (e.g., industry-wide costs, performance metrics, and so forth). More generally, any data associated with or available from the manufacturing system, and/or external data available to the manufacturing facility and potentially relevant to manufacturing processes performed at the manufacturing facility, may be received and used as manufacturing data as that term is used herein.

As shown in step 304, the method 300 may include converting manufacturing data into an intermediate representation. For example, this may include converting the manufacturing data into a natural language representation or near natural language representation including a human-readable description of the manufacturing data. In this context, a near natural language representation will be understood to include any human-readable or human-interpretable, text-based representation of data that can be viewed and understood by a human reader in text-based form, and that can be provided as input to a language model. A near natural language representation may include natural language, but may also or instead include other text-based descriptions. For example, a near natural language description need not be conversational, or grammatically or syntactically fluid. Instead near natural language representations may include any descriptions or representations that can be parsed into words or other tokens or symbols that are human-interpretable, and/or that contain semantic sufficient structure for a human reader to discriminate individual items of data or information within the resulting data structure. A near natural language representation may include a table of data with descriptions of rows and columns, pseudo-code describing a programmatic process, text computer code, lists, numerical data, and so forth, as well as natural language content. Thus, for example, a near natural language description of a computer program may include description of the structure of a program, along with a data table used by the program (e.g., "here is a list of names in a user directory . . . ") or a command structure used by the program (e.g., "here are available options for a drop down menu in a user interface . . . "). Where a natural language representation would include language closely mimicking human language, a near natural language representation permits the use of more encoded data in text form, e.g., using schemas, fields, or the like. So for example structured queries, Boolean operators, wildcards, and other logical operators, program command syntaxes, and the like, may be incorporated into a text-based near natural language representation to provide greater flexibility in the format of data inputs.

The manufacturing data may come in a variety of forms. For example, the manufacturing data may include tables, applications, execution information for applications, data queries (and results), data aggregations, machine data, static or meta-information about, e.g., users edge devices, displays, connectors, and any of the other manufacturing data described herein. In one aspect, a supplemental generative AI model may be used to provide natural language descriptions of source data. In another aspect, an embedding may be trained that extracts relevant features from raw data provided by various sources of manufacturing data, and decodes these extracted features into near natural language form.

In one aspect, the manufacturing data may include explicit metadata, such as metadata from at least one application for the manufacturing process. In this case, a text portion of the explicit metadata may be used directly as a part of the natural language representation. The manufacturing data may also or instead include implicit metadata for the at least one application. For example, implicit metadata may include data such as an inferred type for the application, a programming context for the application, and so forth. In one aspect, the type may be inferred using the classification techniques described herein, although other inference techniques may also or instead be used. This approach permits the type of an application, as well as other context, to be inferred based on, e.g., connections to other applications, the type of data received, the type of commands issued, the structure and content of a user interface for the application, a static or behavioral analysis of the application, and so forth.

The manufacturing data may also or instead include process data from at least one sensor in the manufacturing process, such as a sensor controlled by the application. In general, this may include sensor data such as discrete or time series measurements of, e.g., temperature, weight, speed, force, voltage, strain, and so forth. Sensor data may be raw sensor data, filtered sensor data, processed sensor data (e.g., via descriptive statistics or the like), and so forth. Sensor data may also or instead include images or video associated with the manufacturing process, which may be processed using any suitable image processing techniques, or used as direct inputs where the corresponding generative AI system is multi-modal (e.g., can process text, images, sounds, etc.). In this context, the sensor data may also or instead include data from other devices and the like in the manufacturing context. For example, the sensor data may include data from a tablet, mobile device (e.g., smartphone, digital camera, etc.), desktop computer, laptop, or the like, which may provide additional sensors for providing time series data, or may include user input from such a device, which may be used as sensor data in the context of the manufacturing data.

The manufacturing data may also or instead include process metadata for a sensor. This may, for example, include process metadata obtained from an application that controls or uses the sensor, a user description of the sensor, descriptive data encoded on the sensor or provided by a manufacturer, or any other source of process metadata available for the sensor from within the manufacturing process or system. In one aspect, the process metadata may include context such as a physical or logical location of the sensor in the manufacturing process. In another aspect, this may include patterns of data input and output, or any other contextual information or the like available for the sensor. In another aspect, the sensor may be a sensor from an external device that is coupled to the manufacturing process and/or an application controlling the manufacturing process. For example, the sensor may be a sensor in a user device, e.g., a camera or microphone from a user's smartphone, tablet, laptop, desktop computer, or other personal computing device.

As noted above, the intermediate representation may include any natural language or near natural language characterization of the manufacturing data. It will be understood that other structured or unstructured forms of data may also or instead be used, e.g., where a generative AI model supports other modes of input and/or output such as images, audio, video, and so forth, or where the generative AI model supports a multi-model interface (e.g., with a different format for input and output, and/or with multiple forms of input and/or output). The intermediate representation may include explicit structure, or the intermediate representation may be unstructured natural language data without any explicit structure provided by, e.g., fields, columns, rows, schemas, or other organizing context. In another aspect, structure or features for the data may be provided in the near natural language representation. For example, the intermediate representation may be a narrative summary of a data table retrieved in response to a structured query, such as:

In this data query named 'best operators' there are 10 rows and 3 columns. The columns are 'Name', 'Time', and 'Process'. The first row is 'Johnny', '90' (seconds), 'Process Widget.' The second row is In general, the intermediate representation may be any natural language characterization or near natural language characterization that allows an inference engine to use a pre-trained large language model (such as ChatGPT 3, ChatGPT 3.5, ChatGPT 4, Google's Bidrectional Encoder Representations from Transformers (BERT), and so forth) or the like to process or reason about the data semantically, bringing in knowledge from across a wide domain of training materials. The inference engine may also be fine-tuned on data from a specific domain, such as a particular industry, academic or scientific discipline, and so forth. It will be understood that, while the method 300 shown in FIG. 3 focuses on text-based natural language processing, similar generative AI models may be created for other modes of input and/or output such as audio, speech, video, images, and so forth. The intermediate representation may usefully include any of the foregoing, provided the corresponding generative AI system can interpret the data. Thus, for example, the intermediate representation may usefully include a photograph of a workstation or a workpiece, e.g., at the beginning and end of a workflow provided the inference engine support image inputs. Alternatively, an embedding or an image-to-text inference engine may be used to extract features from images for use in the near natural language representation.

As shown in step 306, the method 300 may include requesting a summarization of the (near) natural language representation from a first model, such as by requesting a summarization of a human-readable description from a first large language model. The first model may more generally include any suitable foundation model, such as a language model or a large language model pre-trained on a large corpus of text. The model may also or instead include a refined large language model, or a language model trained on, e.g., domain-specific content for a manufacturing environment or the like, and/or an embedding for extracting domain-specific features of interest to augment a prompt or other request to an inference engine that uses a more generic foundation model. It will be understood that the model may be also or instead include a student model trained with any of the above, or any other compressed model or the like suitable for, e.g., edge computing, event processing, or other deployment in a local context. As a significant advantage, a generative AI system may be trained on a large corpus of text to respond to semantic cues, such as "summarize this data . . . ," thus facilitating an automated conversion of the intermediate representation into a natural language description using the processing power and knowledge encoded in the large language model.

In order to request a summarization, the intermediate representation of the manufacturing data may be presented to the model, and the model may be requested, e.g., with a suitable prompt or the like, to generate a description or summarization of the intermediate representation. The request may be accompanied by supplemental information such as "This table holds the execution times of Step A as well as the value of Widget B over time." In another aspect, the request may be accompanied by other forms of supplemental data, such as a picture of a workstation or workpiece, or a screenshot of a user interface for an application. In general, supplemental information may be explicitly provided by a user, or may be automatically generated using a domain-specific embedding, retrieval-augmented generation (RAG), or other techniques to automatically generate (or locate) and append supplemental information to the intermediate representation. The request for a summarization may also be further parameterized using natural language or near natural language to manage a prompt to a language model or the like, e.g., to request specific analysis or recommendations, or to focus the analysis on particular areas of interest. For example, the input to the model may request initial insights relating to, e.g., possible data anomalies or result effective variables, or may provide instructions about how to organize or summarize the data.

As shown in step 308, the method 300 may include requesting an analysis of the summarization. This may include presenting the summarization from the first model to a second model, along with a request for an analysis. The request for analysis may be presented as a prompt to a language model, or as any other suitable request formatted for the model as appropriate. In one aspect, the request may include a request for one or more result effective parameters for the manufacturing process, e.g., variables that affect the speed, cost, quality, or other characteristic(s) of the process. In another aspect, the request may include a request for possible improvements, quality control measures, modifications, and so forth. In one aspect, the request for analysis may include one or more analysis parameters presented in natural language to the second model. For example, the request for analysis may request specific statistical analyses (mean, standard deviation, etc.), comparisons (e.g., compare operator 1 to operator 2, or manufacturing line 1 to manufacturing line 2), optimizations (e.g., "How do I make this faster?" or "How do I reduce error rates?"), or other analysis of result effective variables and the like.

For example, after obtaining a summarization in natural language form from the generative AI system, a second model can be used to analyze or reason about the summarization, or about multiple summarizations concurrently. For example, given a stack of summarizations of an execution of an application ("Alice completed app A in an average of 30 seconds with an average of 5 defects per day, Bob completed app A in an average of 36 seconds with an average of 3 defects per day, . . . "), a request to the model for analysis may be stated as "Who is the best operator on app A in terms of time?" or "Who is the best operator in terms of defects?" A user can also ask for recommendations to improve the process, or for recommendations on suitable database queries, code revisions, and so forth. These latter recommendations may be parsed back to SQL, user interface reconfigurations, application code, or the like by the model, or may be presented in text form for use by a user that receives a corresponding result. In one aspect, the second model may include a large language model that is asked to generate one or more suitable SQL queries to implement the recommendations, or to generate code to implement the revisions. In another aspect, the model may be asked to modify a code segment in an existing application to achieve a recommended result.

Thus, in general, the method 300 may include requesting a summarization (of near natural language description) from a first model (such as a first language model), and requesting an analysis of the summarization from a second model (such as a second language model). The second model and the first model may be the same (e.g., a single large language model used at both steps in the method 300, either concurrently or sequentially), or one of the models may be a different model, e.g., a language model trained or fine-tuned with domain-specific training data for the manufacturing environment or some other knowledge domain. For example, by refining the first model for the current manufacturing environment, a summarization can be rendered that more accurately expresses the operating environment for downstream use by non-domain-specific inference engines. Similarly, by refining the second model, analysis and recommendations may be more closely tied to that operating environment. In either case, the system may also or instead benefit from non-refined models, which may advantageously support inferences derived from a broader, more generalized knowledge base-inferences that might not be immediately apparent to a user with expertise limited to a specific manufacturing context.

In one aspect, requesting the analysis may include requesting computer readable instructions implementing one or more recommendations contained in the analysis. For example, the input to the generative AI model may include a request to identify the operator with the lowest error rate, and recommend code changes in an application based on the behavior of that operator. Many current large language models can generate executable code based on task descriptions or other specifications, and can be specifically requested to produce code, e.g., in a particular programming language or for a particular interpreter or environment. However, more refined models may also or instead be used to generate code suitable for a particular manufacturing context based on, e.g., available libraries, connectors, resources, code bases, and so forth. In another aspect, the request may include particular formats for summary data. For example, the request may include a request for a pie chart, graph, time series comparison, or other type of visual output based on the data input and any intervening analysis by the large language model.

As shown in step 310, the method 300 may include parsing one or more recommendations from the analysis. In general, this may include parsing the results into a different format or adapting the results to a specific use context. For example, in one aspect this may include parsing the results into one or more computer-readable instructions for the manufacturing process, one or more written recommendations, one or more modifications to a low-code or no-code application, one or more visual presentations, and so forth. Where parsing the recommendations includes creating computer-readable instructions, this may include a variety of coding tasks including creating code for an application in the manufacturing process, creating code for a machine that performs tasks in the manufacturing process, modifying code for an existing application, and so forth. In one aspect, creating computer-readable instructions may include creating code for a connector that programmatically couples different resources in the manufacturing process, or that connects to resources external to the manufacturing process. For example, this may include connectors for coupling between HTTP-based API's and SQL databases, or more generally for interconnecting programming interfaces and database interfaces.

As noted above, parsing recommendations may include manual/human handling of output from the second model, or this may include an explicit request for code, process step descriptions, or the like from the second model as part of the recommendations. In another aspect, a third model may be used to convert the recommendations from the second model into computer executable code, e.g., after review by a human technician, administrator, or the like.

As shown in step 312, the method 300 may include performing further processing on the analysis. For example, this may include receiving the analysis from the second model and presenting the analysis to a user. This may, for example, include displaying the output from the second model (and/or third model, where code generation is separately performed), or post-processing the output for presentation, e.g., for normalization, for consistency with terminology used in the manufacturing process, to format or organize the output data, to augment the results, and so forth. For example, in one aspect, this may include presenting recommended coding changes, along with an explanation for the nature of, and reasons for, the recommended changes. In another aspect, this may include recording results of the analysis, and/or transmitting the results to one or more users. More generally, any type of post-processing, storage, refinement, augmentation, or other processing may usefully be performed before, during, or after presentation of the results to a user.

Figure 4:
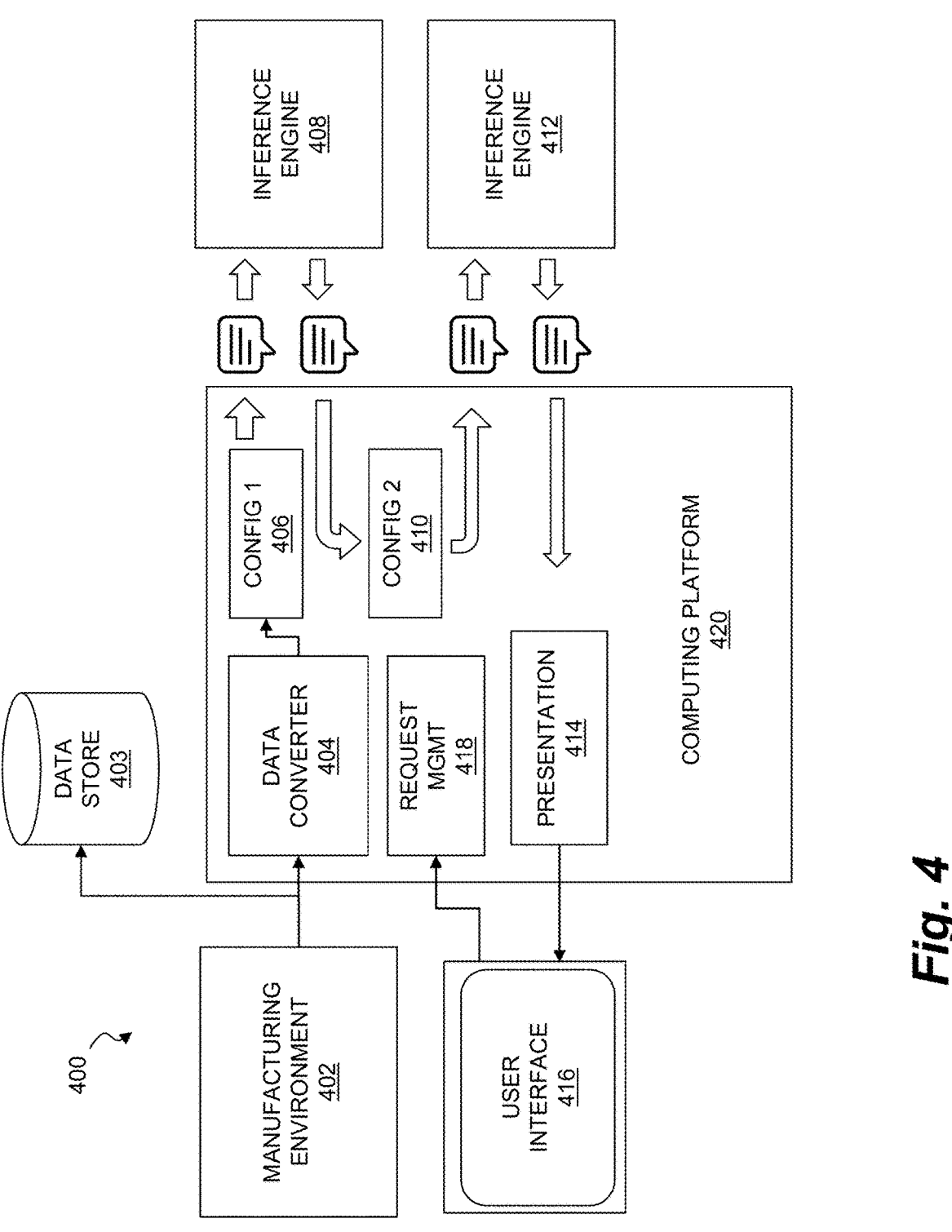
FIG. 4 shows a system for generating recommendations for a manufacturing process using generative AI.

FIG. 4 shows a system for generating recommendations for a manufacturing process using generative AI. The system 400 may include a manufacturing environment 402, such as any of the manufacturing environments or systems described herein. The manufacturing environment 402 may generate manufacturing data from, e.g., sensors, human inputs, applications, and the like that are associated with a manufacturing process, which may be stored, for example, in a data store 403, e.g., as a data stream or as raw data. In general, this data may be filtered, augmented, aggregated, or otherwise processed for storage and/or for subsequent use in generating recommendations. As noted herein, manufacturing data may also or instead include external data such as process documentation, user manuals, third party data, customer requirements, product specifications, regulations, industry standards, inventory and price data, process images, process videos, and so forth. In one aspect, the manufacturing data may include metadata such as explicit metadata from an application used in the manufacturing or implicit metadata for an application used in the manufacturing process. For example, the explicit metadata may include text such as labels, tags, or descriptions included in or associated with the application, which may be used to support a natural language description of aspects of the manufacturing process. The implicit metadata may include, e.g., inferred data about the application that is not explicitly encoded in the source(s), but can be inferred based on other available information. For example, this may include an inferred type or classification for the application (e.g., based on the application classification tools described herein), and an observed programming context such as other applications that are connected to or otherwise related with the application, other applications installed on or executing on a manufacturing workstation with the application, and so forth. Implicit metadata may also or instead include, e.g., behavioral features of the application, a programming language or software environment for the application, and so forth. The implicit metadata may also be used as part of a natural language or near natural language description of the manufacturing process supported by the application (or group of applications).

In another aspect, the manufacturing data may include process data from one or more sensors in the manufacturing process, which may be used for real time monitoring and control, and to support safety, product quality, efficiency, and so forth. For example, the sensors may include one or more of temperature sensors, pressure sensors, motion sensors (including accelerometers, gyroscopes, and so forth), contact sensors, level sensors (e.g., to measure a level of a liquid in a reservoir), flow sensors, position sensors, proximity sensors, vision sensors (including still image cameras and video cameras), acoustic sensors, humidity sensors, vibration sensors, chemical sensors, and so forth. This may be converted into text form for use in natural language processing, e.g., by converting numbers to text, or providing descriptors for data tables, time series data, and so forth.

Process data may also include process metadata for the one or more sensors. For example, sensor metadata may include context for a sensor that describes, e.g., intrinsic properties of the sensor (units of measurement, range of measurement, accuracy, sampling rates, etc.) or information about how the sensor fits into a manufacturing process (e.g., location, purpose, connected applications, and so forth).

A data converter 404 may be used to convert data from the manufacturing environment 402 to a format suitable for further processing. For example, the data converter 404 may receive the manufacturing data from the manufacturing environment 402 and generate a near natural language description of the manufacturing data for use by a language model. For example, descriptive metadata may be used to create natural language characterizations of applications, application data, application logs, sensors, sensor data, and so forth, so that the data can analyzed within the context of the manufacturing process. As a significant advantage, this permits an inference engine such as a large language model to analyze and interpret manufacturing data in the correct context, rather than simply as a collection of structured or unstructured quantitative data. In particular, the metadata for the sensor(s) can impart physical meaning to quantitative data, and metadata for the application(s) can permit inferences about, or reasoning based on, the intended use and nature of the sensor data. A variety of techniques are known in the art for automated data augmentation, and may be used to augment raw sensor/application outputs with suitable metadata to assist in interpretation for the purposes described herein.

It will be understood that real time data from a manufacturing environment 402, particularly a large, complex manufacturing environment 402, may be substantial, exceeding megabytes or gigabytes of raw data. While the data store 403 may be scaled to suitable capacity, processing data at this scale presents additional challenges. As a significant advantage, the data converter 404 may apply scaling strategies to manage the quantity and quality of data that is presented to inference engines. In one aspect, this may include filtering real time data to a time scale of interest, and labeling data according to a type of event, source of event, and so forth, in order to compress the data that requires processing. In another aspect, the data converter 404 may extract statistical descriptions (minimum, maximum, range, mean, median, mode, variance, trend analysis, regression parameters, etc.). In another aspect, the data converter 404 may hierarchically or iteratively apply a language model, e.g., to summarize groups of events in a related meta-segment of data, and then to summarize a group of such summaries, in order to distill the raw data before initiating an analysis. In another aspect, other inference engines or tools may be used, for example, to segment time series data into epochs or large-scale events, before requesting an initial summary of a group of events.

In one aspect, the data converter 404 may deployed in whole or in part as an edge computing process at or near the source of the manufacturing data, e.g., as a distilled inference engine such as a student model or other reduced-parameter model for continuous, real time inferencing. This permits some or all of the distillation to be performed on the data stream as it is produced by the manufacturing environment 402, and prior to communication to a remote resource and/or deployment of a large scale language model to summarize and analyze the manufacturing data. More generally, distributed processing for the data conversion step permits data intensive operations to be performed closer to the edge, and may use lightweight, distilled, and/or student models as appropriate for inline processing of manufacturing data, while also improving the communications efficiency by reducing the quantity of data that is transmitted to a remote data conversion resource. According to the foregoing, in one aspect, there is described herein a method and system that uses edge processing of manufacturing data including an inline inference engine that distills manufacturing data for transmission to a remote data conversion resource.

A first configuration module 406 may be used to present the converted data from the manufacturing environment 402 to a first inference engine 408, such as a language model, large language model, refined language model, student model, or the like. In one aspect, a language model such as a large language model may be used to advantageously support inferences based on a knowledge domain derived from a large corpus of text-based documents upon which it was trained. The first configuration module 406 may be configured to request a natural language summary of the data from the manufacturing environment 402, e.g., by presenting the near natural language description from the data converter 404 to a language model or other first inference engine 408 along with suitable prompts. It will be understood that the use of near natural language as a medium for exchanging data permits the use of commercially available, preexisting, very large language models that encode correspondingly large knowledge bases due to the quantity and quality of text upon which they are trained. However, other data types may also or instead be used. For example, where the manufacturing data includes audio or video data, a corresponding audio or video model may usefully be employed as the first inference engine 408 instead of, or in addition to, a large language model. There are suitable pre-trained foundation models for, e.g., video, audio, or image input, which may also or instead be used with embeddings to extract features of interest from this and other mixed-mode content. Similarly, where the output is an intermediate output that is not intended for human use, any suitable output format may be used, and embeddings or feature-based representations may be used, e.g., to compress data, identify features, facilitate insights, and so forth.

A second configuration module 410 may be used to present the output from the first inference engine 408 to a second inference engine 412. For example, the second configuration module 410 may be configured to receive a natural language summary (e.g., of manufacturing data from the manufacturing environment 402), and to present a request based on the natural language summary to a second large language model. More specifically, the second configuration module 410 may present the natural language summary to a second language model or other second inference engine 412, along with a request for a recommendation, e.g., in a natural language prompt or other request format adapted to the inference engine.

In one aspect, the first inference engine 408 and the second inference engine 412 may be the same inference engine, such as a commercially available large language model. In another aspect, summary and analysis may be combined into a single step, such as where a single configuration module is used to present a single request for summarization and analysis to a single inference engine. In another aspect, the first inference engine 408 or the second inference engine 412 may be a different inference engines, such as a language model trained or refined using a knowledge base for the manufacturing environment 402, or some other data set specific to the data context or the requested analysis.

A presentation module 414 may receive the recommendation from the second inference engine 412, and may perform any supplemental post-processing useful for presenting the results to a user. For example, the presentation module 414 may receive a natural language recommendation from a second language model, and may parse the recommendation for presentation in a user interface 416 according to one or more user criteria. This may include filtering the recommendation, formatting the recommendation for presentation in a user interface (e.g., as one or more windows showing relevant data, analysis, recommendations, code implementing recommendations, and so forth), or augmenting the recommendation with manufacturer data. For example, language in the recommendation may be mapped to vocabulary, process descriptions, and the like from process documentation so that the results are cast in a rubric that can be readily understood and interpreted by a human reviewer who is familiar with the manufacturing environment 402.

In one aspect, the presentation module 414 may usefully manage queries to the data store 403, e.g., to access raw data from the manufacturing environment 402 to augment analysis and recommendations that are output by the second inference engine 412. As a significant advantage, this permits inference based on a reduced-size, abstracted data set, while permitting augmentation with more granular data once a particular recommendation is identified. Thus, for example, where temperature is identified as a result-effective variable for time to complete a manufacturing process, complete temperature data and task completion time data may be retrieved from the data store 403, and used to augment the analysis and recommendations presented to a user. More generally, this approach advantageously facilitates hierarchical management of data and conservation of computing resources, while preserving full access to source data where it is necessary or helpful for evaluation by an end user.

The user interface 416 may provide an interface for a user to configure a request, and to receive results from the request. For example, the user interface may be coupled to a user request management module 418 that is configured (by computer executable code) to receive a user selection of data from the manufacturing environment 402, along with one or more user criteria for creating a prompt or other version of the request formatted for use by the first inference engine 408 and the second inference engine 412. The user request management module 418 may also be configured to receive a user selection of prompt characteristics for the prompts to the first inference engine 408 and/or second inference engine 412. The user request management module 418 may provide a user-friendly interface for creating requests on one hand, while managing the first configuration module 406 and the second configuration module 410 so that suitable data and prompts (or the like) are presented to the inference engines to generate a response. For example, the user interface 416 may present available data sources from the manufacturing environment 402 as check boxes, drop down lists, or the like so that a user can select what data is to be used when performing an analysis. The user interface 416 may also or instead present one or more pre-configured analysis requests for a user to select from, and/or may receive analysis descriptions as text input directly from a user. The user request management module 418 may receive the various parameters from a user, and may use these parameters to configure the first configuration module 406 and the second configuration module 410 to generate suitable, corresponding prompts for use by the inference engines in generating a response to the request received from the user.

In general, the data converter 404, the first configuration module 406, the second configuration module, the presentation module 414, and the request management module 418 may be hosted on a computing platform 420 such as a cloud computing facility, a virtualized computing environment, one or more servers, and/or a resource locally hosted at the manufacturing environment 402, and/or may be distributed among any or all of these. The first inference engine 408 and the second inference engine 412 may also execute on the computing platform 420, or may be hosted remote from the computing platform 420, e.g., where the inference engines are third party commercial services.

Figure 5:
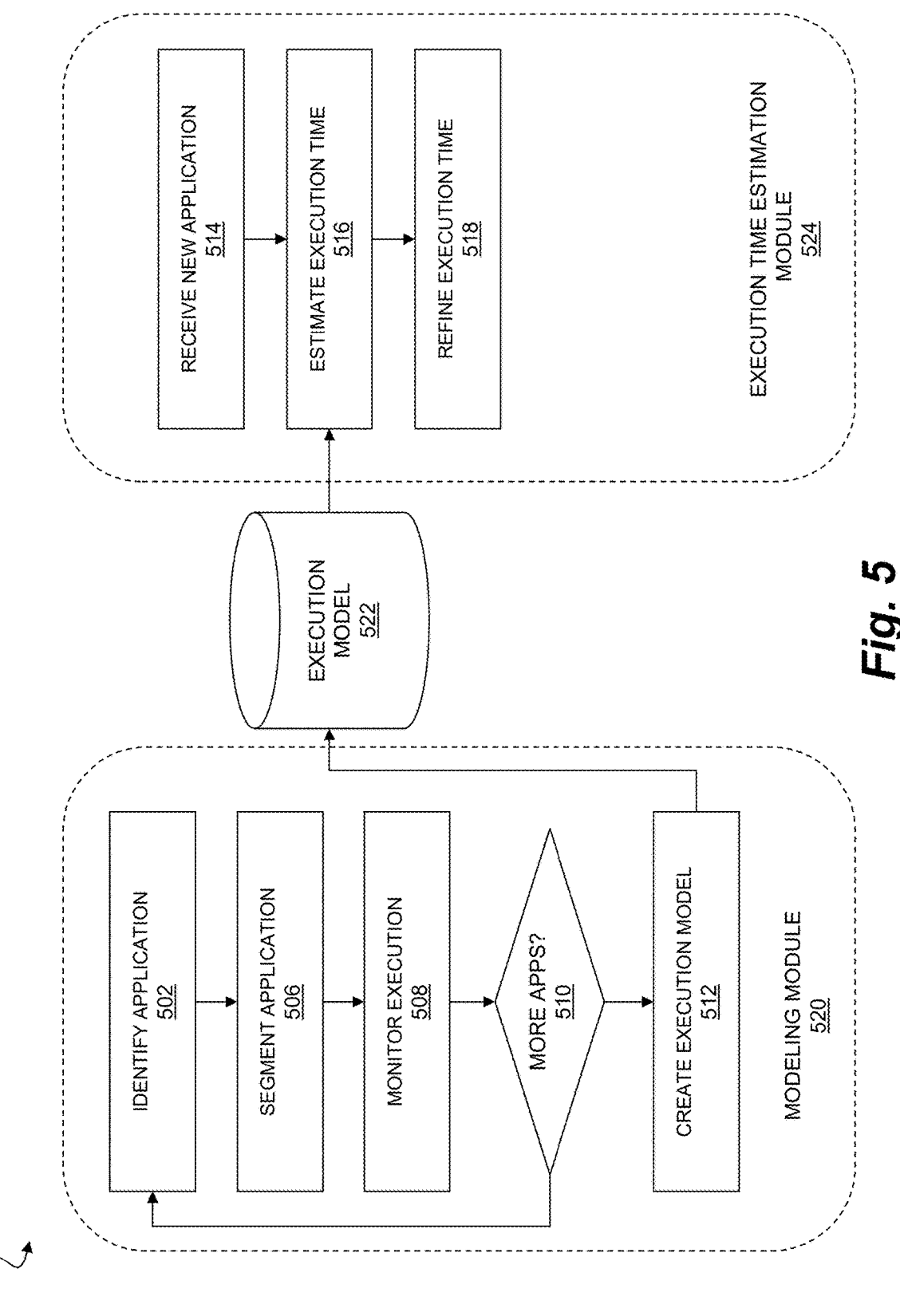
FIG. 5 shows a method for cycle time management.

FIG. 5 shows a method for cycle time management using machine learning. In an industrial processes, a properly instrumented line facilitates capture of data including detected steps, application input, and execution graph transitions, that permit the creation of empirical models of process timing. In this context, a process controlled by individual applications, e.g., at manufacturing workstations, provides a proxy for overall process timing by programmatically dividing a workflow into a number of discrete steps that are completed at each workstation, and/or that are controlled by a user and explicitly completed, e.g., by user interactions with widgets or other controls of the application. These applications provide a useful framework for modeling execution timing by providing an initial, implicit model for workflow (based on application control logic, user interface structure, and so forth) that also facilitates automated detection of process steps based on execution flow, as well as detection and measurement of the contributions of individual functional blocks within an application to the process timing. By gathering data in this manner, an embedding or other model can be created to evaluate similarity of process steps and then descriptors for timing such as statistical descriptors can be associated with the embedding space based on individual timing data for each process step identified for each application. The resulting execution timing model can be used to facilitate timing estimation for new processes.

In general, the method 500 may include automating target cycle time predictions from a manufacturing step or application. In industrial processes, target cycle times for each step may be manually estimated. However, a properly instrumented line can facilitate capture of relevant data including detected steps, application input, and execution graph transitions, that permit the creation of empirical models of process timing to more accurately reflect an implemented process based on statistical timing data or other descriptors for similar steps that make up the process. In this context, a process controlled by multiple applications, e.g., at manufacturing workstations, can also provide a useful proxy for overall process timing by implicitly or explicitly dividing a workflow into a number of discrete steps completed at each workstation, and further into any number of steps, each controlled by a user and explicitly completed, e.g., by user interactions with widgets or other controls of one of the applications. Using applications as a framework for modeling execution timing provides numerous advantages including (a) providing an initial, implicit model for workflow based on the application control logic, (b) facilitating automated detection of process steps controlled by each application (e.g., based on static or dynamic analysis of application execution flow), (c) permitting feature-based comparison to portions of a new or unknown application to select suitably similar timing models, (d) facilitating detection of the contributions of individual processing routines, steps, and the like to the process timing e.g., by monitoring an application during execution, and (e) permitting the use of statistical distributions or other statistical descriptors derived from empirical timing data rather than a single, scalar timing value for each process step.

As shown in step 502, the method 500 may include identifying an application, such as an application that controls a manufacturing process. This may include storing the application in any suitable format and location for further processing. It will be understood that the method 500 may also or instead be used with a process controlled by such an application, or with any other process that can be converted into an execution graph, flow chart, or similar data structure for creating execution models as described herein.

As shown in step 506, the method 500 may include segmenting the application into steps for purposes of characterizing an execution time for the application. For example, this may include programmatically inferring process steps and creating the execution graph based on an analysis of one or more of the software modules in an application. For example, the code of a software module may be programmatically parsed and analyzed to infer one or more steps based on a program flow. Thus, for example, where clocks, timers, and the like are used, or where a software module calls another module or an external resource, or initiates a robotic actuator or performs some other identifiable task, a step may automatically be associated with that portion of the software module. In another aspect, this may include programmatically inferring a step based on user inputs to the software module, or based on features or functions of a user interface for the application. For example, where user interaction is requested by a widget or the like, e.g., to initiate an operation, to indicate approval of a result, to request an inspection, and so forth, these programmatic demarcations may be identified and associated with steps in the process. More generally, any features of an application or the context in which the application executes may be used to support automated, semi-automated (e.g., computer assisted), or manual segmentation into process steps as contemplated herein.

Segmenting may usefully be performed, e.g., based on an inference engine trained with a corpus of applications and corresponding process steps. Segmenting may also or instead include processing with a video model, which may be applied to video of a user interface for an application during execution, a video of a workspace during execution, a video of a user performing the process, and/or other video data for the process. A video model for segmenting an application into steps may include a multi-modal model that also receives as input, e.g., application documentation, process specifications, user manuals, text descriptions, and so forth. In one aspect, the video model may usefully include an initial embedding layer for extracting segmentation features from videos specific to the relevant manufacturing context for the process and any known, corresponding control applications.

For some process steps, an execution graph and individual execution times may usefully be modeled based on application content, including user interface text in the program code, explanatory images/videos, and so forth. Where the application flow provides discrete user inputs on step completion (or intermediate status or user questions), this application flow may be used to infer steps suitable for modeling of timing. Other techniques may also or instead be used, e.g., to infer steps, and or to encode individual steps for use in later modeling, any of which may be used to identify segments or steps in a process, and/or to create an embedding, feature vectors, parameters, or the like for evaluating similarity to other steps to facilitate analysis of a new, unknown application.

Other context may also be used to infer segmentation and identify process steps. For example, a particular step associated with a particular application may have a context including code segments, functions, libraries, software modules, and the like associated with the application, as well as triggers for actions within the application, variables maintained and updated by the application, records captured by the application, machines and/or devices controlled by or monitored by the application, connectors to other applications and process entities, and so forth. Each interaction point in an execution graph or other data structure describing these elements provides a potential demarcation for a process step that may be modeled for step timing.

In general, an execution graph, as described herein, may be any graph or similar representation or description of causal relationships, temporal relationships, or other dependencies among nodes, where each node may in turn include a state or step, e.g., of a manufacturing process or an application controlling same. For example, each node may be a function call, instruction, data processing operation, or discrete unit of work withing the manufacturing process. The nodes may be interconnected by edges that represent transitions or flow among states ("nodes") based on an action or event such as a menu selection, button click, database or variable change, external interrupt, sensed condition, passage of time, and so forth. In general, the edges represent dependences and indicate an order of operations between nodes. An execution graph provides a useful representation of a process, or an application to control a process, and may be explicitly provided with the application, or inferred using the techniques described herein to segment code and other data sources into an execution graph describing a process flow.

More generally, any techniques for automatically converting the code of an application into segments, based on, e.g., static analysis, behavioral analysis, external monitoring, supplemental data, and so forth, may be used to segment an application into steps. In general, the result may be any segmentation, decomposition, embedding, latent space vector, or other representation of the code suitable for evaluating similarity to new, unknown code for purposes of comparison, more specifically to estimate process times as described herein. The segmentation may use program data as well as any suitable supplemental data such as video monitoring data, sensor data, spatial process information (e.g., robotic span, working volume, etc.), and so forth.

In general, the steps in the application, or in the process controlled by the application, may include one or more steps controlled directly by the application, e.g., where the application autonomously executes a process step based on timing, sensor feedback, trigger events, and so forth. The steps may also or instead include one or more steps controlled by a user of the application, e.g., where the user interface prompts a user for input during the process.

In another aspect, e.g., where one or more of these steps have a known latency, this may also be used to programmatically infer or estimate step times associated with the corresponding steps. While it is possible to proceed directly to monitoring and statistical modeling without initial estimates of execution times for individual steps, or for the overall process, a preliminary time estimate for each step can also help to converge more quickly and efficiently at an accurate characterization of the process or help to identify errors in segmentation. For example, an initial timing expectation for an application, or for one of the steps, may be obtained from a variety of sources. For example, the timing expectation may be based on manual user steps in the process, prior observations, design expectations, regulations or industry standards applicable to the process, and so forth.

As shown in step 508, the method 500 may include monitoring execution of the application. In general, applications for a manufacturing process will run in real time, and data may be collected in substantially real time for any monitored aspects of the process. For example, monitoring may include receiving execution data from the application, and/or receiving sensor data from one or more sensors controlled by the application and/or from one or more sensors independent from the application The realized timings for each step may be collected over any suitable window of time, and at any suitable temporal resolution, and may be based on any monitored inputs such as sensor feedback, user input to an application prompt, machine vision, and so forth. Thus, monitoring may include acquiring timing data such as a timing data distribution for each step, and/or one or more other statistical descriptors or other quantitative descriptions. In general, a greater volume of timing data will increase the quality of the timing data model for each step. The timing data may be stored for an application, e.g., as raw timing data, as a distribution, as statistical descriptors (e.g., mean, median, variance, and so forth), or in any other suitable format for executing time modeling as described herein.

As shown in step 510, the method 500 may include determining whether there are additional applications to be analyzed. If there are additional applications, the method 500 may return to step 502, where the next application is identified and processed (e.g., for segmentation and monitoring). If there are no additional applications, the method 500 may proceed to step 512 where an execution model can be created. Thus, the method 500 may generally include segmenting a plurality of applications for a plurality of processes into steps, measuring execution times for the plurality of processes controlled by a plurality of applications in a manufacturing environment such as a manufacturing line or other manufacturing context, and creating an execution model based on the results. In one aspect, a single process may be controlled by a plurality of applications. In this case, returning to step 502 may include repeating the analysis for each of the plurality of applications to obtain step contributions to overall process timing.

As shown in step 512, the method 500 may include creating an execution model for the application. In general, this includes the generation of an embedding, latent space, or other feature-based representation of each process step that permits a similarity analysis for steps of a new, unknown application, along with a corresponding timing model such as an average, a range, a variance, a distribution, and so forth, as well as combinations of the foregoing. In one aspect, the step timing models may include distributions (e.g., Normal/Gaussian distributions) for the timing interval for each step, rather than a single numerical value, and/or any other suitable statistical descriptors or the like. As a significant advantage, where execution steps are modeled as distributions, actual execution times for individual steps that are captured during execution may be reported relative to confidence intervals or the like rather than as binary evaluations of whether a particular timing metric was met, and multiple consecutive steps can be better modeled for overall expected process timing.

By way of example, an application for a manufacturing process may include three widgets (or other modular software components or the like) that provide a first button to perform a task, a second button to approve a step/item, and a third button to request assistance. As an initial pass, each of these items may have been assigned an expected time based on a contribution of the associated task to the total step time. After collecting real time data, the overall step may be found to take more or less time than initially estimated. This time differential may be allocated among the widgets, each representing a normally distributed subpopulation of the total step time, e.g., by fitting the data to a Gaussian Mixture Model or similar distribution in a supervised machine learning process in order to estimate parameters for each step. More generally, any technique for aggregating a number of probability distributions may be used to estimate an aggregated timing for a step, or for an application that performs a number of steps, in order to support the creation of an empirical execution model as contemplated herein.

In one aspect, a regression model or the like may be used to associate the contribution of steps, e.g., concurrent, overlapping, or alternative steps, to an overall process time. Thus, creating the execution model may include creating a regression model including one or more parameters relating step times or other outputs of the embedding for the application to a process time for an application. For example, regression parameters may be calculated for a linear regression or similar model that estimates total process time based on the sum of times for process steps, more specifically based on the execution model for the underlying process. With the embedding(s) described herein and the regression model, the step time for a new application may usefully be estimated by generatively estimating step times or distributions with the embedding based on characteristics of an application, and then combining these step times using a regression model to estimate the overall process time for the new application. In one aspect, the user interface (represented as screen shots, images, user interface code, or the like) may provide a basis for identifying steps and/or creating an embedding in a manner that facilitates step time estimation for a new process. In another aspect, the regression parameters for the regression model may also be selected based on the embedding, e.g., by selecting regression parameters based on similarity to other applications (or other process descriptions).

In one aspect, matrix factorization may be used to model the contribution of each step, widget or the like to the total execution time. In general, matrix factorization is a mathematical technique that decomposes a matrix into a product of two or more simpler matrices. The goal of matrix factorization is typically to find a low-rank representation of the original matrix that captures the underlying structure and patterns in the data, thus reducing the dimensionality of the original matrix to facilitate analysis and processing of matrix data. The resulting representation can also often help to characterize the underlying structure and pattern of data in the matrix, e.g., for use in generating executing timing estimates as contemplated herein. In the context of machine learning solutions to execution time modeling, matrix factorization may be used to analyze raw timing data to create a distributed, mixed model or the like for a particular application. For example, a matrix may be created including a latent space of step types (e.g., image widget, text widget, other step types) as columns, and actual execution times in rows. Matrix factorization may then be performed to identify the latent factors that explain variation in execution times across the different types of steps. These latent factors may then be used to predict a total execution time for an application (or other unit of process) based on constituent elements.

In another aspect, creating an execution model may include creating an embedding for components of an application. For example, this may include decomposing the application into any suitable components such as steps characterized in software modules, widgets, user interface components, execution graph nodes, and so forth. Feature extraction or the like may then be performed to characterize each component in an embedded space. A variety of embedding techniques are known in the art, and the choice a particular technique may depend on the nature of the data (e.g., tokenization for text, or resizing/normalization for images) and a variety of other factors. In general, the embedded space can usefully represent steps in the process in a manner that facilitates identification of similar steps for purposes of selecting a suitable step timing model or step timing estimate.

Other techniques may also or instead be used. For example, where steps are sequential and/or have a dependency, a recurrent network or attention-based model or transformer may usefully be employed to draw inferences about total process time.

The use of a number of applications to create the execution model generally facilitates pooling of distributions and distribution data across multiple applications and process steps in a manufacturing process, as well as comparisons between different processes that produce similar physical outputs, or that have similar applications or process flows. More generally, this permits the creation of company-specific, industry-specific, or process-specific databases of step time models for expected execution timing. Comparisons or models may then be based on known similarities. In one aspect, this may include similarities in the applications themselves. For example, certain user interface elements, widgets, or functions may be associated with particular execution models, and corresponding step timings. Similarly, a particular type of step (e.g., insert four screws with a T9 Torx™ screwdriver) may have similar timing expectations independent of the workpiece or manufacturing context. As another example, certain types of processes have steps prescribed by regulation, industry standard, or common practice, and may usefully be modeled across companies and/or processes. For example, a safety audit, pharmaceutical line clearance, or visual part inspection may have similar or identical use cases across users. In another aspect, different application categories may be used to estimate timing. For example, an application may be categorized as "assembly" (simple, moderate, complex, . . . ), machining, quality control, etc., and this may be used to establish an initial timing estimate for a particular application, or to parameterize process steps within a latent space or embedding. This may also include mixed-type categories (e.g., 80% assembly, 20% quality control), each of which may receive a separate execution model, or separate embeddings when evaluating an unknown application for purposes of estimating execution timing. These characteristics may be determined based on descriptive metadata, inferred from characteristics of an application, or using any of the other techniques described herein.

As shown in step 514, the method may include receiving a new application (also referred to herein as an "unknown application"), or any other process description suitable for use with the execution model, e.g., images, video, documentation, and so forth. In one aspect, this may include receiving text descriptions or near natural language summaries of the application or steps of the application, which may be generated using any of the techniques described herein. In another aspect, receiving a new application may include receiving a classification or the like for the application, e.g., a type or other description obtained using a classification engine. The new application may include at least one software module or the like for controlling a process such as a manufacturing process in a manufacturing environment.

As shown in step 516, the method 500 may include estimating an execution time for the new application with the execution model. Where the received application does not include accompanying segmentation or step descriptions, this may include decomposing, segmenting, or otherwise analyzing the application, e.g., as described above, in order to identify process steps and transform the process steps into the embedded space to select a suitable timing model, e.g., based on similarity to other process steps contained in the execution model 522. Each similar step (or set of steps) in the embedded space may then be used to provide step time estimates, and, where available, regression parameters for the associated process steps, which can be used in turn to calculate a process time, or a range or distribution of process times representing an estimated execution time for the process controlled by the new application.

As shown in step 518, the method may include refining the execution time for the new application, e.g., by monitoring usage of the application after creating the initial execution time estimate. In this context, monitoring execution may include adjusting timing for one or more steps in the process. This may include, e.g., incrementally adjusting timing distribution(s) for the new application as data is acquired, or regenerating the execution model with the updated data. In general, statistical tuning may be performed over any suitable interval. In one aspect, the execution time data may be tuned over an initial monitoring phase until the estimate(s) become stable, after which the step time(s) can be fixed for future use. In another aspect, execution may continue to be monitored after the initial estimate, and the estimate for the application (and/or the execution model for all processes) can be updated continuously or periodically on a rolling basis, based on a predetermined historical window of execution data (e.g., preceding seven days, preceding four weeks, etc.). In another aspect, the execution time estimate may be periodically compared to actual execution timing, and an update or other review may be automatically recommended when the actual execution timing deviates in some manner (e.g., beyond a threshold for maximum excursion in individual times, maximum change in a mean or median, change in the standard deviation, and so forth) from the execution time estimated based on the model.

According to the foregoing, there is described herein a system including a database storing an execution model 522 for process steps in industrial processes, wherein the execution model includes an embedding for a first plurality of software modules and associated step times measured for each of the first plurality of software modules while controlling one or more of the industrial processes. The system may further include an execution time estimation module 524 configured, e.g., by computer executable code executing on one or more processors, to: receive an application, parse the application into a second plurality of software modules, map the second plurality of software modules to the first plurality of software modules based on the embedding, apply the execution model to derive timing descriptions for one or more steps in the application, and combine the timing descriptions to obtain a total execution time for the application. The system may also include a user interface configured by computer executable code executing on one or more processors to receive a submission of the application, including any of the application descriptions herein, from a user and to display the estimated process time for the application to the user.

In one aspect, the execution time estimation module 524 may be configured by computer executable code embodied in a non-transitory computer readable medium and executing on one or more processors to: receive an application, and to parse the application into a second plurality of software modules. The execution time estimation module 524 may then map the second plurality of software modules to the first plurality of software modules, e.g., using an embedding such as any of the embeddings described herein, and may apply the execution model 522 to derive statistical descriptors for one or more steps in the application based on proximity to one or more of the first plurality of software modules in an embedded space of the embedding. The execution time estimation module 524 may then determine an estimated process time for the application, optionally using a regression model or the like to model alternative or overlapping process steps.

In general, the user interface may facilitate use of the execution model 522 by permitting a user to provide or identify a new application, and to apply the execution model 522 to the new application for derivation of an execution time estimate. For example, the user interface may be configured (e.g., by computer executable code) to receive a submission of the application from a user and to display the estimated step time for the application to the user. The user interface may also facilitate subsequent steps such as estimate validation, estimate refinement, and so forth, as well as preceding steps such as creation and tuning of the execution model 522 stored in the database.

Figure 6:
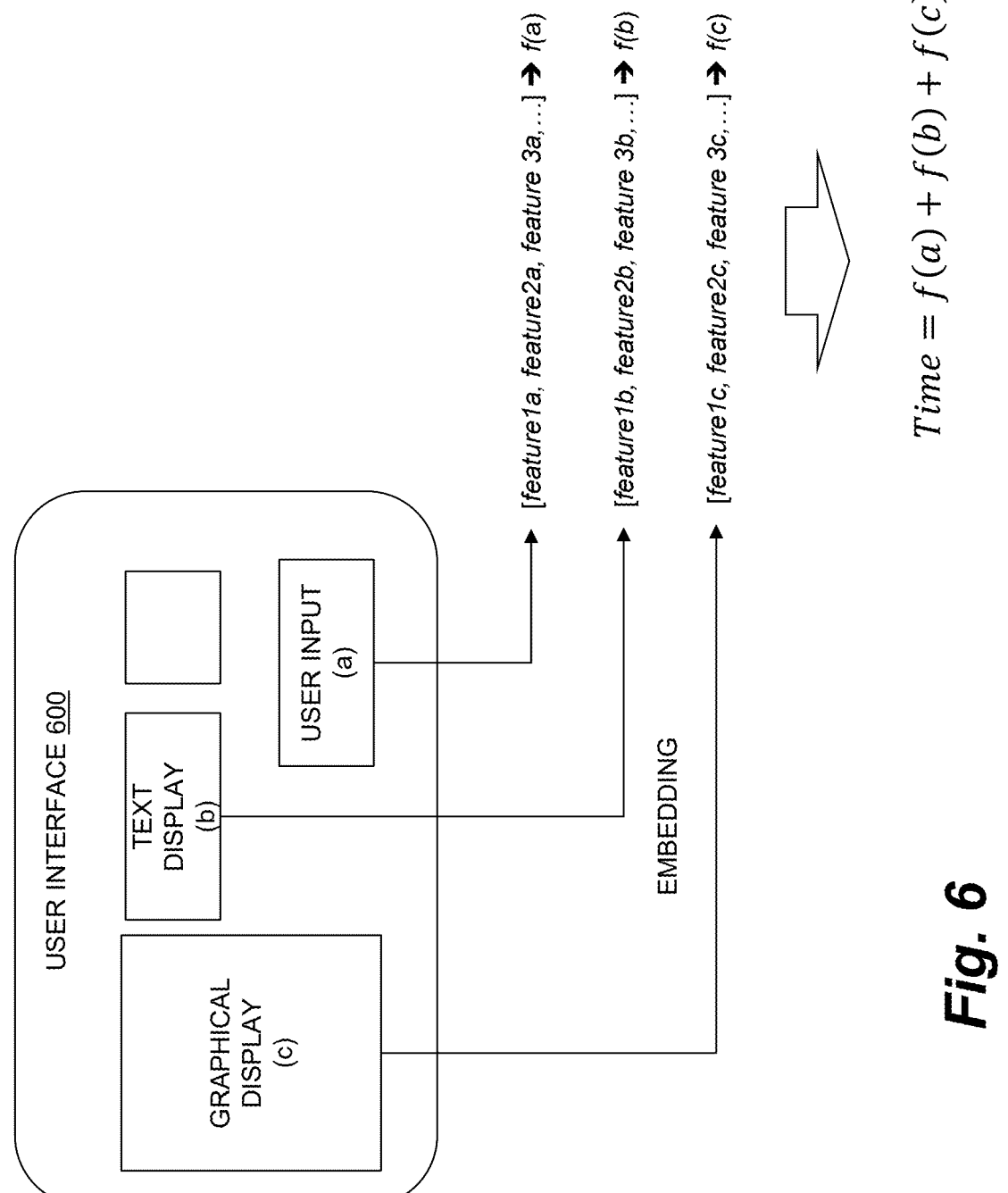
FIG. 6 illustrates the creation of an execution model for estimating execution time based on user interface components.

FIG. 6 illustrates creation of an execution model for estimating execution time based on user interface components. In general, a user interface 600 for an application that controls a process in a manufacturing environment may include a number of features, such as a graphical display (e.g., of process inputs, outputs, video monitoring, time series data, etc.), a text display (e.g., of user instructions, quantitative data, tables, etc.), and a user input field (e.g., to receive text input, or input via other user controls such as checkboxes, radio buttons, drop down lists, and so forth). These user interface elements may be mapped into an embedding space using any suitable feature extraction, analysis, and the like. From the embedding space, time estimates or step time models may be extracted that are associated with each element of the user interface (e.g., f(a), f(b), f(c)), e.g., based on a most similar prior application, or based on a location within the embedding space. As described above, these may be statistical descriptors such as a mean, a median, a mode, a variance, a standard deviation, a range, and so forth, or these may be a distribution of time values associated with the location in the embedding space. In order to estimate an execution time, the individual time estimates may be summed into an execution time ("Time") associated with the user interface 600. It will be appreciated that, while a user interface decomposition is illustrated, steps in a process may be based on wide variety of inputs such as the user interface, video data, image data, audio data, application code, sensor data, execution graphs, application documentation, segmented process steps, and so forth, any of which may be used to create an embedding for process steps to accompany timing estimates/models as described herein.

In one aspect, a total time for an application may be a sum of estimated times for individual steps, such as process steps inferred from the user interface and/or from other data. That is, an application may have a number of different user interfaces, user prompts, sensor triggers, manual assembly steps (monitored by the application), and so forth, each of which may be evaluated as described above. It will also be understood that, while a user interface provides a convenient example that is readily visually decomposable into constituent components suitable for feature extraction, any other process step representation may be used based on, e.g., program flow, connectors, user inputs, automated robotic handling, and so forth, any of which may be used individually, or summed together to estimate a total process time for an application, or for a process controlled by an application.

Figure 7:
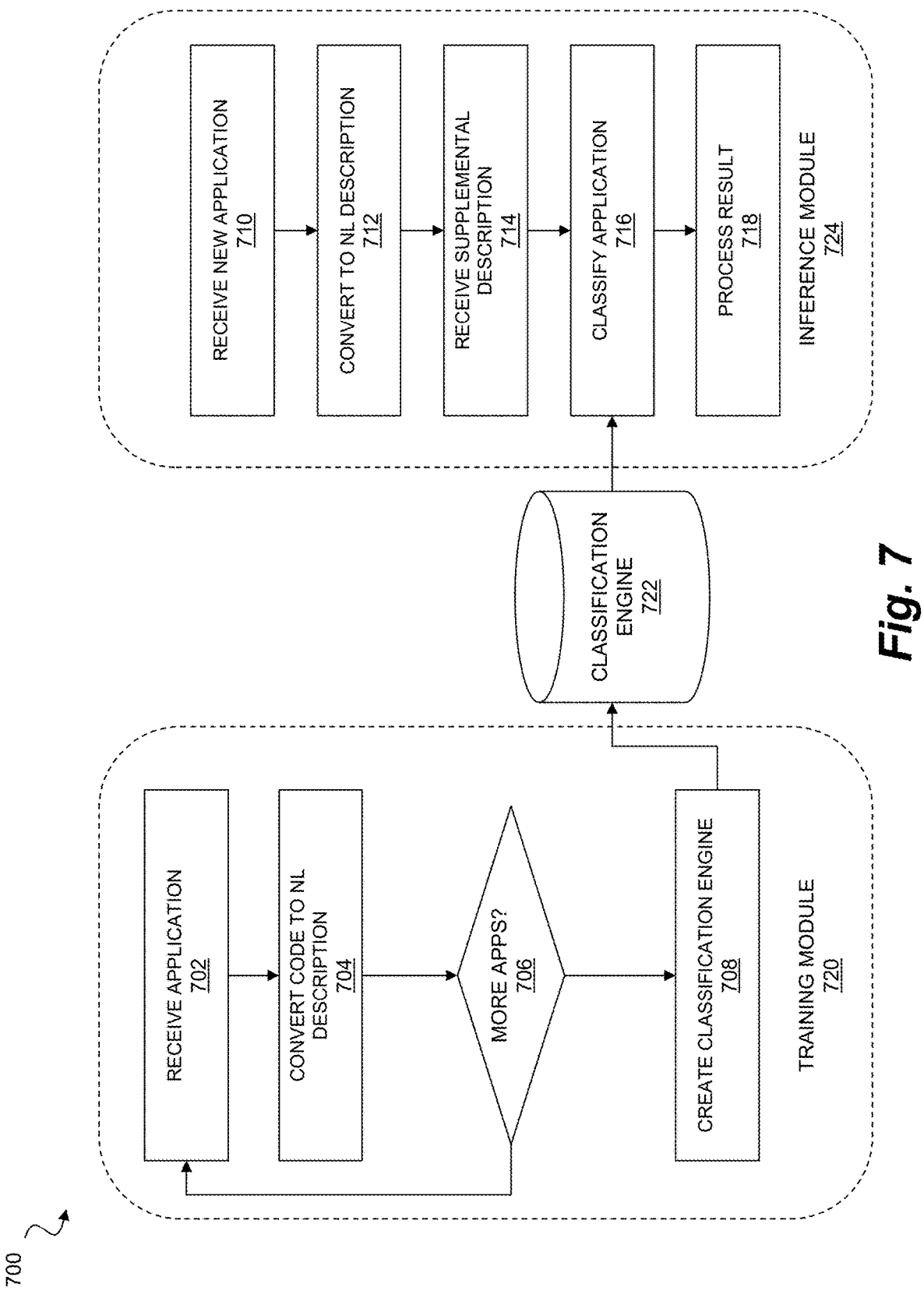
FIG. 7 shows a method for classifying an application with natural language support.

FIG. 7 shows a method for classifying an application with natural language support. In modern industrial environments, there may be numerous independent applications deployed throughout a facility, all performing different tasks, gathering different data, and communicating data and control information among one another. For example, this may include applications for industrial control, quality control, work instructions, training, oversight, and so forth. Against this backdrop, an AI system can be trained to assist in identifying new applications based on natural language characteristics, e.g., in order to support administration and management of the software infrastructure for a facility, or to support other generative AI tools and techniques described herein.

As shown in step 702, the method 700 may include receiving a computer representation of an application. For example, this may include receiving a computer representation in a text-based format such as a JavaScript Object Notation (JSON). While a variety of human-readable computer languages and code representations are known, JSON is a lightweight data interchange format that is particularly easy for humans to read and write, and uses a structure that is generally easy for machines to parse and generate. It is a text format that is often used for transmitting data between a server and a web application as an alternative to XML, and provides a convenient medium for translating executable information into human-readable information. It will be understood that other types of human readable code may also or instead be used. And with a suitably trained model, such as a model trained to recognize or interpret assembly code or byte code, other forms of code may also or instead be analyzed. However, as a significant advantage, JSON is well-suited for analysis by existing large language models (such as ChatGPT or BERT) without a need for preprocessing or model refinement.

As shown in step 704, the method 700 may include converting a computer representation of the application into a natural language description of the application. In one aspect, this may include converting the computer representation of the application into natural language with a pre-trained generative model such as any of the language models described herein. For example, this may include submitting the application to a large language model, along with a prompt to generate a text-based summary of the application. The prompt may specify additional details or parameters for the summary, such as a desired length of the summary, format of the summary, informational content for the summary, and so forth. For example, a JSON application definition may be submitted to a large language model, such as any of those described herein, which may be prompted to generate a text-based, narrative summary of the JSON application definition. In response, the large language model may output text that summarizes the JSON description in a form such as:

This is an application comprising four steps. All steps have a menu button and a "next" button and a "previous" button. The first step has the text "Choose your work order by scanning the accompanying QRC. "The second step . . . "

In another aspect, descriptions may be created using a variety of different input modes and/or output modes. For example, the descriptions may include near natural language descriptions, visual representations, programmatic representations, and so forth. In another aspect, the model may be requested to convert applications of various types into a JSON application definition or other common format for use in classification, or to include a source JSON application definition along with additional description content created by the model. Other useful text-based descriptions that may be used as inputs or outputs with a human-readable format included, e.g., XML descriptions, YAML descriptions, and so forth.

The method 700 may also or instead include manually converting some or all of the description into a narrative description, or supplementing the computer-generated description with other information such as application metadata, known functions or context, and so forth. In another aspect, a user may pre-identify code segments having known functions or uses before the application is submitted to the large language model for inferences. In another aspect, the large language model may indicate where inferences are unsupported or when an output has a low probability of being accurate in order to facilitate manual intervention where necessary or helpful in producing an accurate summary of the application.

In one aspect, the method 700 may include preprocessing the unknown application before submitting to a pre-trained generative model for processing. For example, this may include performing a low-level textualization and/or cleanup, e.g., to remove or filter extraneous content, and/or to remove or modify media types unsuitable for the pre-trained generative model.

As shown in step 706, it may be determined whether additional applications (or other process descriptions) are available for training. If additional applications are available, the method 700 may return to step 702 where a next application may be received for processing. If no further applications remain for processing, the method 700 may proceed to step 708 where a classification engine can be created. In general, a number of applications may be processed to train a system for classification, and a greater number of samples can generally improve the predictive power of statistical or machine learning classification. Thus, more generally, receiving an application (or other code, code segment, software module, or other computer representation or the like) may include receiving a plurality of representations of a plurality of applications, which may be processed in series, in parallel, or some combination of these using the additional steps described herein. It will also be understood that the initial computer representation may be the application itself, either in a compiled, uncompiled, or byte code form, and a human-readable representation may be obtained for or derived from the application as appropriate. Thus, the method 700 may more generally include receiving a plurality of applications and converting the applications, or accompanying descriptions thereof, into a plurality of text descriptions with a generative large language model or the like as described herein.

As shown in step 708, the method 700 may include creating a classification engine, such as a classification engine trained to identify a type of an unknown application. Where a large language model can provide adequate categorization for classification needs, the large language model may be used as a classification engine without further processing. Creating a classification engine may also or instead include extracting features or text tokens from the natural language description and transforming the extracted information into an embedding, latent space, or other suitable layer of a classification model, which may be used in turn with unsupervised clustering, supervised classification, and/or other machine learning strategies to create a classification engine for identifying a type.

In one aspect, text description of an application may be augmented with supplemental information to support multimodal classification. The supplemental information may, for example, include any other data, such as audio, video, screen shots (e.g., a screen shot captured during execution of the application), user manuals, text descriptions, images, code segments, schemas, user interface descriptions, code specifications, code samples, flow charts, data output, logs, contextual information, written documentation, and the like, which may be used to create one or more additional embeddings or the like, e.g., in an embedding space for the text description. For example, the non-text data may be concatenated with the text-based embedding, and clustering can be performed around the combined embeddings to support improved typing. Thus, in one aspect, the classification engine may be configured using a first embedding based on features of the plurality of corresponding descriptions from the plurality of representations in the text-based format and a second embedding based on features from a plurality of supplemental descriptions of the plurality of applications. As a significant advantage, this approach can facilitate efficient use of relevant classification information that may be difficult to adequately capture in text-based descriptions.

In one aspect, a large language model may be used with the natural language description and supplemental information as a zero shot classifier to provide directed classifications. The large language model may also be fine-tuned with application classification information, including examples of applications with known types.

In another aspect, an initial classification engine may use a self-supervised embedding model to create a baseline embedding that can transform an application into a numeric representation within the embedding for purposes of comparison to other applications, and more specifically, for purposes of further classification. While this may generally use a text summarization as described herein, the classification may also or instead advantageously employ a multi-model model that can be trained in a self-supervised way. For example, a multi-model inference engine may be implemented with a separate head for each of two or more content types, e.g., text summary, code, images, video, and so forth. The inference engine may then be trained, e.g., using contrastive learning loss to minimize a masking embedding metric so that the model can, e.g., predict a code segment such as a widget that has been removed from an application. In this manner, the embedding may be trained to identify features and patterns relevant to classification, and may be used, e.g., as an input to an inference engine used for classification.

By way of a more detailed example, once a number of modalities are defined as inputs for an inference engine, each mode may be suitably preprocessed. Thus, for example, images may be preprocessed using techniques such as resizing, normalization, and so forth. Text preprocessing may include tokenization, stopword removal, and embedding using language models. Code may be preprocessed by tokenization, and also using code-specific embeddings such as CodeBERT or Graph Neural Networks for representing the syntactic structure of code. In general, each modality may have its own embedding layer designed to convert the input into an embedding vector. For instance, this may include a convolutional neural network (CNN) for images, a transformer for text, and a graph neural network or long short term memory for code. After embedding, a fusion mechanism may be employed to combine these embeddings, e.g., into a fixed length numeric representation for further processing. Techniques can include simple concatenation, attention mechanisms, or more complex fusion layers that allow interactions between modalities. One or more projection heads may then be provided to project the combined embedding to a space where contrastive learning can be used for unsupervised learning to create an inference engine that can identify similar applications or sections of applications.

For example, Contrastive Language-Image Pre-training (CLIP) or Simple Framework for Contrastive Learning Representations (SimCLR) may be used to apply contrastive learning to a corresponding multi-model data set. In this context, CLIP advantageously supports multi-model data, and is well suited for tasks requiring understanding of both visual content and text descriptions, including zero-shot or few-shot scenarios. SimCLR, by contrast, is well-suited for environments where large amounts of unlabeled visual data, e.g., images, are available, and can be used to pre-train a model that is later fine-tuned on smaller labeled datasets for specific tasks. These or other techniques may usefully be employed in this context to support multi-model classification of an application. As a significant advantage, this general technique permits comparison of applications having several different modes of relevant description, and significantly differing lengths or complexities.

As shown in step 710, the method 700 may include receiving a new application, such as an unknown application that has yet to be classified. This may include receiving the application in any form suitable for further processing as described herein, including without limitation uncompiled code, byte code, script, JSON application description, YAML, and so forth.

As shown in step 712, the method 700 may include converting the new application into a text-based format or other natural language description, e.g., using any of the techniques described herein. In one aspect, this may include submitting the new application to a language model such as a large language model along with a prompt for a description of the new application.

As shown in step 714, the method 700 may include receiving a supplemental description of the new application. This may include any of the supplemental or augmented descriptions or data described herein, and will preferably be matched to the type of supplemental data used to train the classification engine 722. In one aspect, this may also include generating an embedding for the supplemental data to extract features, and/or transform the supplemental description for the new application into a vector or set of vectors that can be used as inputs for classification.

As shown in step 716, the method 700 may include classifying the new application by applying the classification engine to the new application, e.g., based on the description and the supplemental description, and/or any associated embeddings. For example, the description may be in the form of a JSON application definition, or any other suitable text-based format or other representation derived from the new application and/or consistent with the classification engine. In one aspect, the supplemental information may include a screen shot of a user interface, window, or other visual output from an application while executing during a process, or an embedding for such an image. The supplemental information may also or instead include data logs, user inputs, data outputs, and so forth, or any other supplemental data described herein that might be useful for determining an application type with a classification engine.

The output of the classification engine 722 may be an application type, such as any type or category useful for managing applications in a manufacturing environment or the like. For example, the types may include one or more of a driver, productivity tool, artificial intelligence tool, real-time processing, connector, communications, terminal/console, inventory management, help/instructions, quality control, assembly, tracking, robotics control, sensing, machine vision, and so forth. The type may also or instead be an industry category, such as electronics, automotive, pharmaceuticals, life sciences, and so forth. In another aspect, the type may include a device platform such as mobile device, smart phone, tablet, wearable, eyewear, augmented reality, and so forth. More generally, the categories may include any category or group of functional categories, user categories, process categories, industry categories, and so forth useful for organizing and managing software in a manufacturing environment. The classification engine may also, for example, produce an accuracy estimate such as a probability of belonging to one or more categories. In another aspect, the classification engine may automatically flag a result for human review, e.g., where the classification engine returns a number of categories with similar likelihoods of being correct, or where the highest probability category remains low (e.g., below 50%).

As shown in step 718, the method 700 may include processing the result(s) from the classification engine. For example, this may include displaying the classification to a user in a user interface, e.g., for review or further action, or applying a policy or management rule for an enterprise to the new application based on the classification (e.g., to submit for review, to add to a repository, to limit authorized users, etc.). A classification may also be used for any of the other application analysis or management tools described herein, e.g., where a classification is used as supplemental information for input to another generative AI process. More generally, the resulting output, e.g., a type, category, or other classification for the new computer representation, may be used in any suitable manner for managing applications at a manufacturing facility or the like such as flagging an application for security review, distributing an application to appropriate personnel or data repositories, and so forth, or any of the other uses described herein.

According to the foregoing, there is also disclosed herein a system for classifying an application with natural language support. The system may include a training module 720 stored in a memory, a classification engine 722 executing on one or more processors, and an inference module 724 executing on one or more processors. The classification engine 722 may be configured using a first embedding based on features of a plurality of text-based descriptions generated by a large language model for a plurality of applications, and using a second embedding based on a plurality of supplemental descriptions for the plurality of applications, the plurality of supplemental descriptions including a plurality of screenshot captured during execution of the plurality of applications. In general, the classification engine may be trained, e.g., with the training module 720, to identify a type of a new application based on a text-based description of the new application created by the large language model, and further based on the supplemental description for the new application. The inference module 724 may perform the steps of: receiving a submission of an unknown application in a user interface, obtaining a first text-based description for the unknown application with the large language model, submitting the first text-based description and a first screenshot for the unknown application to the classification engine, and displaying a result for the unknown application from the classification engine to the user, the result including the type of the unknown application.

Figure 8:
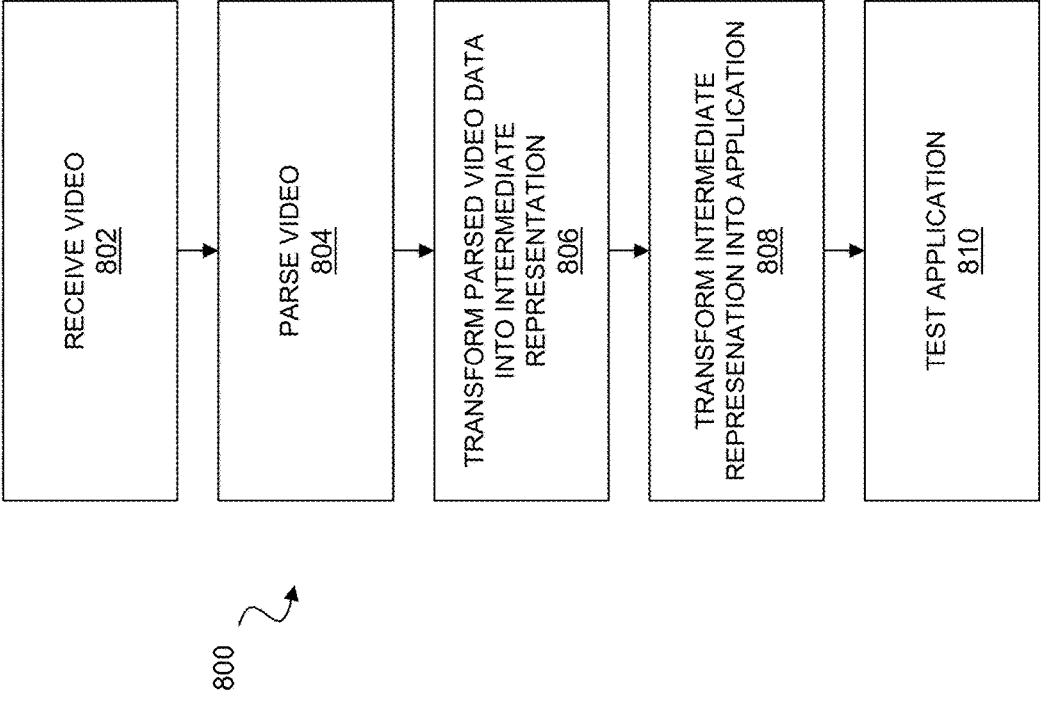
FIG. 8 shows a method for computer-assisted conversion of a video description of a process into an application for controlling the process.

FIG. 8 shows a method for computer-assisted conversion of a video description of a process into an application for controlling the process. Application creation can be a tedious, manual task, typically with a steep, domain-specific learning curve. This challenge has led to a variety of no-code and low-code solutions to various programming challenges, but there remains a need for application development tools suitable for non-programmers. As described herein, a video of a manufacturing process, along with accompanying narration and other descriptive materials, can be used to automatically generate an application for control of the manufacturing process, or to assist in a semi-automated generation of the application. As a significant advantage, a generative artificial intelligence system can support the application creation process by providing domain-specific process knowledge and automated code generation tools to convert general process descriptions into an application that is executable in the manufacturing environment for the process.

As shown in step 802, the method 800 may include receiving a video of a manufacturing process. The video may, for example, include a visual recording of a sequence of images, as well as an audio recording captured, e.g., concurrently with the visual recording from a microphone of a recording device. In one aspect, the audio recording may include a concurrent narration by a user during the manufacturing process. This permits a freeform data entry for the user, who may simply describe what is occurring in a spoken, natural language form, for later processing. In general, the video may include any activities related to the manufacturing process, such as assembling a product, data entry, scanning, quality control, and so forth.

In one aspect, the video may usefully include narration by the engineer or other personnel while the activity is being recorded in order to provide a contemporaneous oral description. This may include general descriptions of various steps ("I am now attaching the widget to the phidget."), and may usefully include one or more mistakes that occurred during execution of the manufacturing process ("Oh this screw is the wrong screw, I should have picked screw #4."). Mistakes may be, for example, known failure points based on historical data, anticipated failure points for a new process, actual failure points observed during process creation, or any other predicted, likely, or highly undesirable failure points that might usefully be anticipated and managed while creating a process flow for an application used to control or perform the process. While mistakes may usefully be identified while narrating a video, it will be understood that possible/likely mistakes may also or instead be documented in other ways to accompany. In another aspect, the narration may include data collection and/or validation steps ("I am measuring the diameter and logging it. If the outside diameter is greater than five millimeters, this is a defective part."). In one aspect, the video instructions may include multiple paths/options for correction, and/or alternative production workflows, or the video may include various exit or warning conditions ("If this happens-please call a supervisor.").

In another aspect, the video or audio recording may include a description of computer-implemented steps. For example, a narrator may say, "the adhesive is then cured under ultraviolet at full intensity for thirty seconds," or "the workpiece is heated until a surface temperature of one hundred degrees Fahrenheit is reached." This permits incorporation of sensors and computer-implemented steps prior to any physical deployment of associated hardware.

In another aspect, the video may include a video of an authoring tool or a user interface that is controlled by the video creator during the recording. In one aspect, this video of the user interface may usefully be captured concurrently with a video of a person performing process steps in a time synchronized manner to permit analysis of the physical user steps and the interactions with the user interface. Thus, the video may include user interface actions, e.g., in a generic user interface (that is, not specific to the process being recorded), or in an authoring tool that captures user interface aspects of a process for purposes of creating an application. In one aspect, the narration for the video may be usefully provided using the rubric or vocabulary of a particular manufacturing context. This can facilitate proper identification of corresponding actions, descriptions, inputs/outputs, and the like by automated resources supporting the application creation.

It will be understood that various other types of descriptive data may also or instead be included with the video data and may be usefully integrated into the parsing and subsequent steps described herein. For example, this may include physical descriptions of the manufacturing environment, workflow descriptions, schematics, documentation, and the like, any of which may provide relevant context for the manufacturing process that is useful for generating related descriptions, application code, and the like.

As shown in step 804, the method 800 may include parsing the video into a plurality of specific actions in the manufacturing process, e.g., into a plurality of segments for each of a plurality of specific actions in the manufacturing process. This may include, for example, segments for preparation, assembly, inspection, quality control steps, and so forth. In one aspect this may include parsing the video to identify specific actions using, e.g., computer vision to obtain feature data including a description of the manufacturing process, the specific actions, or other aspects of the manufacturing process. For example, this may include performing steps such as action segmentation, natural language action description summarization, keyframe detection, salient keyframe detection, and so forth, e.g., using any of the video segmentation techniques described herein. More generally, any computer vision or other image or video processing techniques suitable for segmenting and/or identifying actions in a video may be used to parse the video for further processing. Manual segmentation may also/or instead be used, e.g., to supplement automated segmentation, to provide quality control for automated segmentation, or to substitute for automated segmentation where automated segmentation is unavailable, or where automated segmentation fails to produce satisfactory task identification within a process.

In one aspect, parsing the plurality of segments may include parsing the video by identifying one or more keyframe detections correlated to user actions. In one aspect, parsing the video may include extracting feature data for segments including action segments, keyframe detections correlated to action segments, and natural language action descriptions correlated to action segments. A variety of techniques are known for keyframe extraction and related functions, such as motion detection, feature extraction, clustering, and the like, as well as the use of machine learning and deep learning modules to provide keyframe segmentation using, e.g., supervised learning, temporal models, and the like. In one aspect, this process may be assisted by an embedding or other fine-tuning tools, or a domain-specific video foundation model, in order to avoid misidentification of activities. As described herein, an automated segmentation may also be supported by concurrent embeddings of related materials such as process documentation, physical descriptions of the manufacturing process, and so forth.

In one aspect, one of the outputs of parsing the video may include a natural language description of events in the video, which may be obtained using an AI model trained to recognize actions and provide descriptive metadata based on video input. In another aspect, natural language action descriptions may be obtained by converting narration into text, and requesting an analysis of the text by a natural language model, e.g., using the techniques described herein. In another aspect, automated machine analysis (e.g., using generative AI) may be performed on both the video and the narration together, e.g., by asking a large language model to compare an automated description generated from the video with a generative large language model summary of the human narration.

As shown in step 806, the method 800 may include transforming the data from the parsed video, e.g., natural language description, extracted features and description, and so forth, into an intermediate representation. In general, the intermediate representation may include pseudo-code, flowcharts, lists of instructions, text descriptions, and any other descriptive materials.

In one aspect, this may include creating a description of the manufacturing process with a first language model, e.g., by requesting a description of each segment in the plurality of segments based on the segmentation and the accompanying video source data. This may also or instead include presenting the data from the parsed video (or the step description derived from the parsed video) to a natural language model or other inference engine for summary and analysis, or otherwise identifying segments in the extracted data suitable for providing a framework for an application. The intermediate representation may, for example, include a flow chart, text description, list of instructions, pseudo-code, and/or other descriptive materials that can be used, e.g., with low-code or no-code tools to generate an application to control the corresponding process. In general, the inference engine may be matched to the type of the desired input or output data type. For example, the inference engine may include one or more of a visual language model, an audio language model, and a large language model, depending on the format of the input data.

As shown in step 808, the method 800 may include transforming the intermediate representation into an application. In one aspect, this may include transforming a process structure identified in the video (using the techniques described above) into a flow control for the application, or into a machine readable description that expresses programming logic based on a structure of the manufacturing process derived from the video, and found in the intermediate representation prepared from the video. For example, the narration for the source video may be independently transformed into instruction steps or logic that provides a framework for the structure of the application. Specific options or forks in process flow can be converted into buttons or other user inputs for making selections. Data collection steps may be converted into input steps. Anomaly thresholds may be converted into validation rules (e.g., outside diameter entered by user cannot exceed five millimeters). More generally, any identifiable step, operation, decision point, error, or the like may be converted into suitable steps for corresponding data acquisition, user input, decision input, program logic, and so forth.

In one aspect, the application created by this step may be a functioning application ready for direct deployment in a manufacturing process. In another aspect, the application may include (or be formed entirely of) pseudo-code that is machine parsable and/or human readable to support rapid, computer-assisted creation of the deployable application. In general, the pseudo-code may be converted using a low-code/no-code platform suitable for creating real time manufacturing applications into a functioning application derived from the programming logic expressed in the pseudo-code, or using other automated code generation tools.

At the same time, a manual, tutorial, or other instructional materials may be automatically created for the process based on the video (including errors, alternative process paths, etc.), and these materials may be incorporated into the application for access by a user while performing steps of the process. This may be performed, e.g., automatically based on the narration accompanying the video, or based on an inference engine trained with other applications and corresponding manuals. The manual may also be manually reviewed for accuracy and completeness.

In general, the machine readable description may include data for the application to control the manufacturing process, or may be converted into data for an application to control the manufacturing process. In addition to computer executable code, this may include text, an image, a user interface layout, a connector, a library, a video segment, an audio segment, a help library for supporting the manufacturing process, and any other useful content or code for deploying an application.

As shown in step 810, the method 800 may include testing the application. In one aspect, this may include generating a test plan based on the video. For example, this may include generating one or more test metrics for each of a plurality of segments in the video, and then creating a test plan based on the one or more test metrics. So, for example, where a validation test is identified in the video (assembly weights between x and y), the test metrics may include a test to confirm that the validation is performed (by a user, or automatically in the manufacturing process) and a result is recorded. Testing the application may more generally include deploying the application at a suitable location in a manufacturing process or the like, and monitoring the process flow at that location to ensure that the process is proceeding according to the model for the video input, or according to a test plan created for the manufacturing process based on the video, and/or the intermediate representation of the manufacturing process. This may be performed automatically in a sandbox or other test environment, or in a live manufacturing environment, e.g., with suitable safeguards and/or human monitoring.

According to the foregoing, a system for computer-assisted conversion of a video description of a process into an application for controlling the process includes a manufacturing environment, a recording device, a memory, and an application generator. The manufacturing environment may be any manufacturing environment configured to perform a manufacturing process as described herein. The recording device may be a video camera, smart phone, webcam, or other audio-visual recording device or the like, and may be configured to acquire a video including a visual recording of the manufacturing process and an audio recording of a concurrent narration by a user during the manufacturing process. The memory may store the video for further processing.

The application generator may, in general, be configured, e.g., by computer executable code stored in a non-transitory computer readable medium and executing on one or more processing devices to generate an application to control the manufacturing process by performing the steps of: parsing the video into a plurality of segments for each of a plurality of specific actions in the manufacturing process using computer vision; creating a description of the manufacturing process with a first inference engine, the description including a step description for each of the plurality of segments based on the video recording and the audio recording; transforming the description of the manufacturing process into an intermediate representation using a summary and analysis of the description from a second inference engine; transforming the intermediate representation into a machine readable description that expresses programming logic for the manufacturing process based on a structure of the manufacturing process contained in the intermediate representation; converting the machine readable description into executable code for the application to control the manufacturing process; submitting the first text-based description and a first screenshot for the unknown application to the classification engine; and displaying a result for the unknown application from the classification engine to the user.

Figure 9:
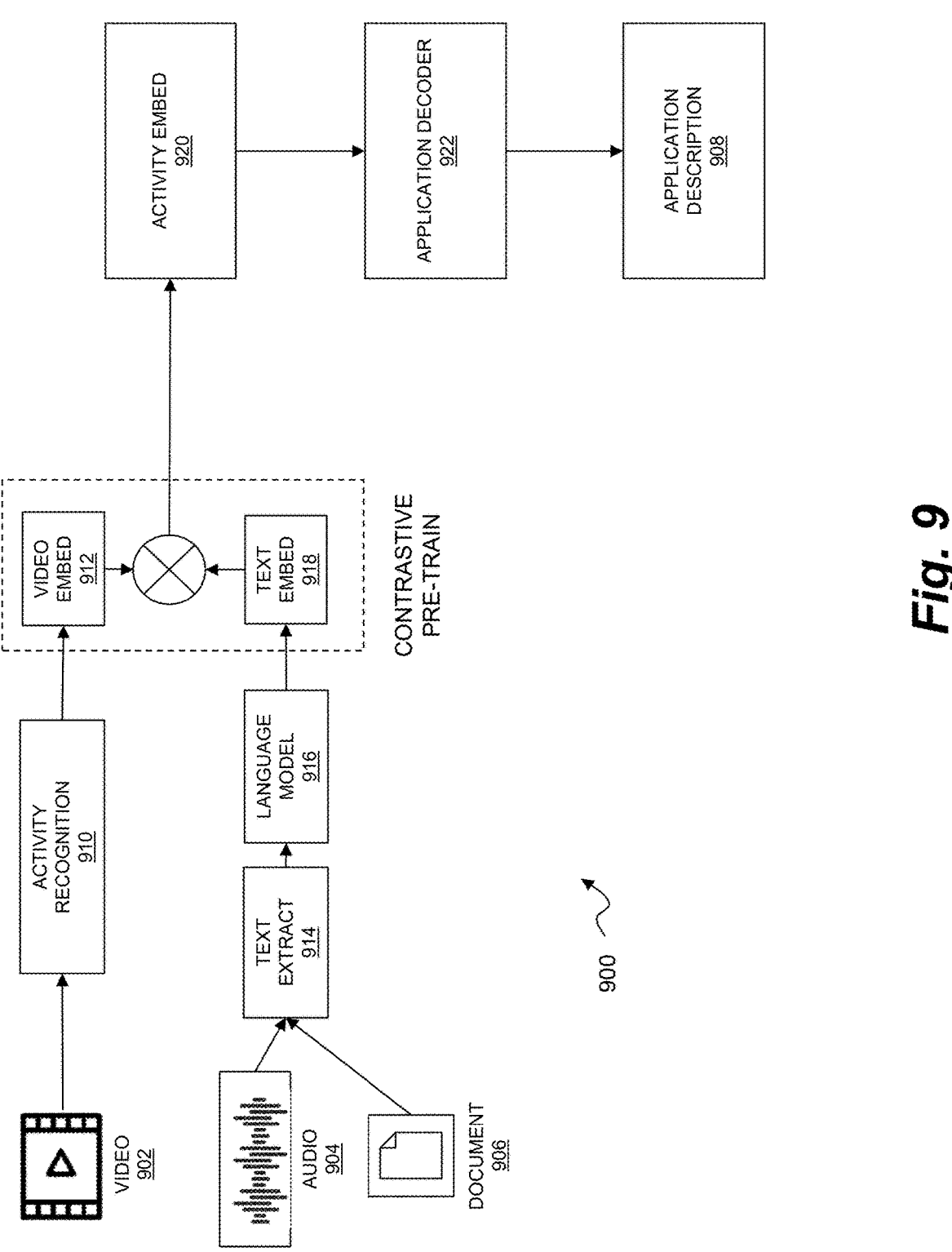
FIG. 9 shows a system for computer-assisted conversion of a video description of a process into an application for controlling the process.

FIG. 9 shows a system for computer-assisted conversion of a video description of a process into an application for controlling the process. In general, the system 900 may include an embedding layer trained on a corpus of video data, audio data, applications, documentation, and so forth, to extract features relevant to application coding. The system 900 may then be configured to receive descriptive data such as video data 902, audio data 904, and document data 906, and to generate an application description 908 using a variety of inference engines including, e.g., an application decoder 922 to generate an application description from a latent space representation of the input data. The video data 902 may, for example, be any video of a manufacturing process, such as video of an operator performing one or more steps of the process, a machine performing one or more steps of the process, an operator demonstrating or explaining one or more steps of the process, a user interface of a software tool used to control one or more steps of the process, a legacy application for performing some or all of the process, and so forth. The audio data 904 may similarly include any audio data acquired during execution of the process. The document data 906 may, for example, include any documents associated with the process such as a text description, process flow, user manual, operator procedures, specifications, guidelines, safety rules, and so forth.

An activity recognition module 910 may process frames of the video data 902 (which may optionally include audio data) to create a video embedding 912 of the video data 902 in a lower dimension semantic representation of the video content. The activity recognition module 910 may then processing this lower-dimension representation to extract keyframes, activity classifications, time segmentations, and so forth, for example using a neural network or other inference engine. The embedding space may, for example, be an embedding space created using application training data and encoding features of applications such as software module functions, triggers, variables, and so forth.

A text extraction module 914 may be used to extract text from, e.g., document data 906 and audio data 904 using any suitable text extraction tools. For example, text may be extracted from audio data 904 using speech-to-text models. Where the document data 906 contains text, this may be extracted directly. Alternatively, images of a document may be analyzed using optical character recognition techniques or the like to extract text data from image data. In another aspect, images, graphs, and the like in the document data 906 may be processed using image-to-text models to obtain plain text summaries thereof.

A language model 916 or other inference engine may then be used to create a text embedding 918 for the audio data 904 and document data 906 that characterizes the process, generally transforming this supporting data in a lower dimension representation that encodes features of an application. In general, the document data 906 may, for example, include documents in the Portable Document Format (PDF) or any other suitable format that contains text, or that can be processed to extract text using, e.g., optical character recognition or other techniques.

The video embedding 912 and the text embedding 918 may be multiplexed to provide an activity embedding 920 in an application embedding space based on features of applications, which may be inferred based on training data from other manufacturing processes. In general, the activity embedding 920 may be a multi-modal embedding trained using, e.g., a self-supervised contrastive learning model or the like. Video-only models for activity recognition are limited in capabilities and accuracy. As a significant advantage, accurate activity recognition can usefully be performed in a manufacturing context by (a) limiting video-based activity recognition to a particular manufacturing context, and (b) supplementing video data with audio and text data to provide a multi-modal embedding space that improves extraction of process features such as step segmentation, activity recognition, and so forth.

The activity embedding 920 for the video data 902, audio data 904, and document data 906 may be provided to an application decoder 922 that is trained to unpack an embedding from the application embedding space (or a hidden layer representation from a latent space layer coupled thereto) into the application description 908. For example, the application decoder 922 may include a text decoder such as a large language model transformer decoder, which may be refined using, e.g., using a Low-Rank Adapter (LoRA) to process the application embedding space. The application description 908 may, for example, include code segments, text descriptions, segment transitions descriptions, or any other text characterization of a new application that can be directly deployed as an executable application, or used by a programmer to generate an executable application.

Figure 10:
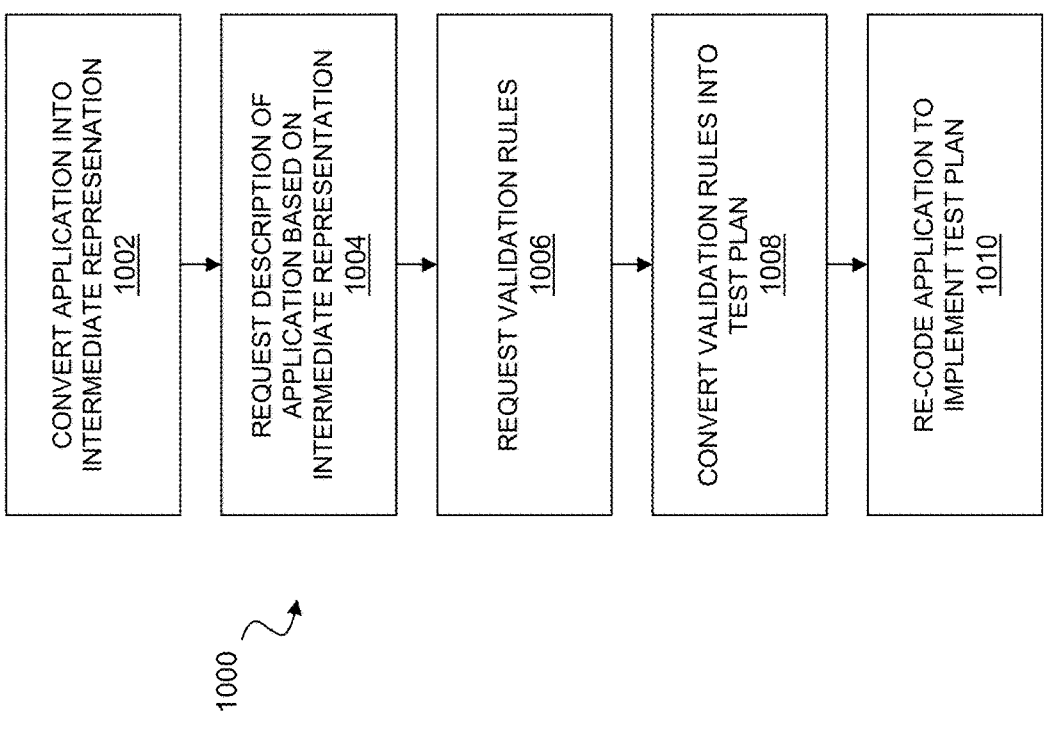
FIG. 10 shows a method for computer-assisted test plan creation using generative artificial intelligence.

FIG. 10 shows a method for computer-assisted test plan creation using generative AI. In general, validation is the process of establishing documentary evidence demonstrating that a procedure, process, or activity consistently produces the expected results or product quality. A test plan for validation outlines the approach, scope, resources, and schedule for validating a product, system, or process to ensure it meets specified requirements and standards. The test plan may include an explanation of what is being validated (product, system, process, etc.), a description of the boundaries of the validation process, a list of items or functionalities to be validated, an identification of any items or functionalities that are out of scope, and so forth. The test plan may also include objectives of the test plan, including clear, measurable validation objectives that align with project goals, along with examples include ensuring compliance with regulations, verifying functionality, assessing performance, etc. In another aspect, the test plan may include a validation approach, such as a description of the overall approach to be taken for validation (e.g., black-box testing, white-box testing, etc.), an explanation of any specific methodologies or techniques to be used, validation criteria (including detailed criteria or standards against which the validation will be measured, and any regulatory requirements, customer specifications, or internal standards), test cases (including a comprehensive list of test cases designed to validate each requirement or functionality), a test environment (including hardware, software, tools, etc.), and any special configurations or setups required for testing. The test plan may also specify, e.g., the assignment roles and responsibilities to team members involved in the validation process, a timeline for the validation process including milestones, testing phases, and deadlines, an allocation of time for each test case or testing activity, a list of resources required for validation including personnel, equipment, software licenses, etc., budget considerations, risk and mitigation strategies, and a plan for documenting test results, issues encountered, and any deviations from expected outcomes. Other aspects of the test plan may include a reporting schedule and format for communicating validation results to stakeholders, a process of approval of the test plan before validation begins, and so forth.

By establishing and following a structured approach, a test plan for validation can help to ensure thorough testing and verification of a product, system, or process, leading to confidence in its quality and compliance with requirements. Adequate validation may be critical when implementing new processes, or when deploying new applications for an existing process. However, validation in regulated and/or complex manufacturing environments can be expensive and time consuming, often requiring proof of execution of various tests and/or process steps. As described herein, generative artificial intelligence can be applied to a manufacturing process to create a test plan related documents for validation, including proof of execution of various tests, process steps, and the like.

In one aspect, a test plan for validation (also referred to herein as a "validation plan") may be automatically generated. In order to create a validation plan, an application may be transformed from an internal, executable representation into a text description, e.g., so that it can be compared to validation requirements. For example, this may include requesting a description of the application from a large language model, e.g., using any of the techniques described herein. This text representation may be augmented with classification information, which may be derived from application metadata or other descriptive information, or derived by classifying the application based on the content and context of the application, as more generally described herein. In another aspect, the application may be segmented or otherwise processed as described herein. The textualization may also or instead be augmented with images, video, and other multimedia or non-text content contained in the application, or with natural language descriptions of any of this content obtained, e.g., from suitable embeddings and/or inference engines.

A validation plan may be automatically generated from the text of an underlying regulation, industry specification, or other formal description of testing/validation requirements. In one aspect, this may include first requesting a natural language description of the regulation, and then requesting a validation plan based on the generated description. In another aspect, this may include initially requesting a comparison to a previous regulation, testing standard, or the like, e.g., to identify changes. This can facilitate directed human intervention to identify where the difference(s) will require additional or different process requirements. In another aspect, the natural language model may be explicitly prompted to explicitly identify changes in a testing/validation process corresponding to any changes identified in the requirements. As context, a generative prompt may include the prior regulation(s) (or other specification, standard, or the like), a prior testing/validation plan, and a new regulation(s). Additional context may also/or instead be provided, such as an identification of human intervention points in the process, available sensors, and so forth. Generation of a validation plan may be supervised, e.g., by initially requesting the analysis/comparison, in order to confirm that the changes identified by the model correctly correspond to actual changes in the regulatory (or other) framework.

In one aspect, the validation plan may be generated by a large language model or other specifically trained AI model, based on text description and any suitable prompts (e.g., requesting a specific type of analysis, specific regulatory or manufacturing context, specific type of testing, etc.) to generate a test plan. The test plan may include touch points to external systems, which may be simulated or otherwise modeled for testing purposes. In one aspect the large language model may interrogate an application developer to parameterize the testing requirements. In another aspect, the test plan may be converted, either by a large language model or by another, specifically trained generative model, into a machine-readable format for use by an automated testing system. In another aspect, a formal proof system can be used to validate test coverage for the test(s) included in automatically generated test plan. In general, a formal proof system can be any system used to verify the correctness of algorithms and computer programs, and may include any systematic approach to validation and testing suitable for safety-critical systems or other contexts where errors can have severe consequences. In another aspect, a testing system may execute the test(s) in the test plan and provide a proof-of-test, which may be digitally signed or otherwise protected against tampering for future reference. Any or all of these techniques may be used iteratively, intermittently, or continuously, or on a predetermined schedule, and/or in response to triggers such as a system change or an explicit save/publication/approval of a workflow. The user interface for an application and/or administrative interface for a facility subject to the testing, may indicate validation status, validations in progress, validation test failures, and so forth.

As shown in step 1002, a method 1000 for computer-assisted test plan creation using generative AI may include converting an application for a manufacturing process into an intermediate representation in natural language form or near natural language form. This may include requesting a description of the application from a first inference engine such as a large language model, or otherwise converting the application into descriptive and/or summary materials using the techniques described herein. It will be understood that a test plan for validation may usefully be created without any application data, however providing a description of an application the performs some or all of the steps in a process that is being validated permits improved accuracy and relevance of a test plan for validating the underlying process, e.g., by providing a description of how some or all of the steps in the process are performed.

As shown in step 1004, the method may include requesting a description of the application from an inference engine based on the intermediate representation. The inference engine may, for example, include a language model, a large language model, and/or a refined language model, or any other machine learning model suitable for the data format of the intermediate representation. In one aspect, the inference engine may include any of the classification engines described herein, and requesting the description may include requesting a classification of the application from the classification engine. This permits the description to be augmented with additional data about the type or context of the application that are inferred from characteristics of the application, e.g., so that appropriate, corresponding testing or validation requirements can be identified and applied.

Requesting the description may also or instead include providing a model such as a language model, large language model, visual model, and/or other model with supplemental descriptive data for the application, such as any of the supplemental data described herein. For example, the supplemental descriptive data may include a screenshot of a user interface acquired during execution of the application, or a description of such as a screen shot obtained from a visual model. In one aspect, the method 1000 may include training an embedding layer for supplemental data in order to identify features or patterns related to testing and validation. The supplemental descriptive data may also or instead include a user interface for the application, a user manual for the application, a video captured during the manufacturing process, a screen shot captured while the application is executing, a user interface layout for the application, a code segment for the application, a text summary of the application, or any other supplemental data that can assist in determining the purpose or function of the application to support an automated generation of testing/validation plans. In another aspect, the supplemental descriptive data may include text descriptions of any of the foregoing, which may be user-provided descriptions or natural language descriptions generated by inference engines as described herein.

More generally, a wide range of supplemental data may be provided and used to augment application descriptions on one hand, and create an embedding used to characterize applications on the other. For example, supplemental data may be acquired from a manufacturing environment such as individual user tendencies observed during monitoring, or user characteristics such as age, experience, efficiency, physical size, and so forth. In another aspect, the supplemental data may include physical characteristics of a workspace, such as a working volume, dimensions of a desk, locations of bins, screens, input/output devices, and so forth. As a significant advantage, these extra modalities, which may be provided as physical specifications, images, text descriptions, and the like, may be used to create a multimodal representation of an application or process that extends well beyond code and machinery, and can improve an embedding space used to extract relevant features from existing testing/validation requirements and to create testing or validation plans as described herein.

As shown in step 1006, the method 1000 may include requesting validation rules from an inference engine. This may, for example, include requesting one or more validation rules for the manufacturing process from an inference engine such as a large language model based on the description of the application and a text description (or other description matched to the input requirements of the inference engine) of validation requirements for the manufacturing process. In one aspect, the validation rules may include a natural language description of one or more rules for meeting the testing/validation requirements for the process. In another aspect, the validation rules may include a written test plan describing how the application and related process steps operate to reliably meet the requirements of the corresponding specification.

It will be understood that, in this context, the terms such as validation rules and validation requirements may refer to any rules, regulations, standards, specifications, or other explicit requirements for a process. Thus, for example, the text description of the validation requirements may be based on a regulation such as a local, state, federal, or international law, rule, regulation or the like applicable to the manufacturing process, or to an output of the process. For example, industries such as pharmaceutical or automotive manufacturing are highly regulated, e.g., for consumer safety purposes, and may be governed by a wide range of applicable laws and regulations. In another aspect, the text description of the validation requirements may be based on an industry standard such as one or more standards promulgated by organizations such as the International Organization for Standardization (ISO), the International Electrotechnical Commission (IEC), the Institute of Electrical and Electronics Engineers (IEEE), the American National Standards Institute (ANSI), the Society of Automotive Engineers (SAE International), and so forth. These and other organizations help to harmonize technical specifications of products and services, making industry operations more efficient and ensuring quality and safety for consumers, and may be used to identify and deploy validation rules and other requirements for manufacturing processes in related industries. In another aspect, the text description of the validation requirements may be derived from written customer requirements, manufacturing specifications, and the like, for the manufacturing process, which may be provided directly by customers in written form, or committed to text based on customer descriptions, contract provisions, and so forth.

While the validation requirements provide one source of validation rules for a test plan, the test plan will also depend on the capabilities of the manufacturing process, e.g., the computing devices, machinery, sensors, human operators, and other context in which a process is performed. Thus, requesting validation rules may also include providing this context to the inference engine that is asked to generate the test plan. For example, requesting the one or more validation rules may include providing the inference engine (such as a large language model or any of the other models described herein) with a sensor description characterizing one or more sensors available to the application during the manufacturing process. The request may further leverage the capabilities of the inference engine, e.g., by prompting the inference engine to suggest one or more additional sensors for the application in order to apply the one or more validation rules. Requesting one or more validation rules may also or instead include prompting the second large language model to specify one or more human touch points for inspection or other action during the manufacturing process. In this respect, the use of a language model and supplemental data can help to ensure that testing plan generation occurs in the context of the capabilities and physical aspects of a particular deployment venue, and/or an application used to control the process.

As shown in step 1008, the method 1000 may include converting the one or more validation rules into a test plan for the manufacturing process. In general, the one or more validation rules may include, e.g., human steps, machine steps, computer steps, inspection steps or requirements (without specifying an actor), and so forth. Converting the one or more validation rules into a test plan may include converting the one or more validation rules from the inference engine into a test plan that can be used to ensure that the manufacturing process meets the validation requirements. The test plan may, for example, include a written test plan, as well as modifications to a process, modifications to applications or the like that control a process, measurements required, and so forth.

A variety of tools and techniques are known in the art for computer-assisted coding and no-code/low-code programming. In general, where new code or coding modifications are included in the test plan, these tools may be used, e.g., by applying natural language processing techniques or the like to interpret a description of a process, applying inference engines such as large language models to identify key components of the description (such as variables, functions, conditions, loops, etc.) that need to be converted into code, and then mapping these components to programming constructs. For example, a loop described in natural language ("for each item in the list") can be mapped to an equivalent do-loop structure in any desired programming language. This latter step may include the use of an inference engine trained on a large corpus of code to learn how programming constructs are described in natural language. With the programming construct(s) identified, code generation generally requires the selection of a target programming language so that suitable syntax and a logical order of steps can be explicitly defined. Code generation may also use templates, libraries, or code generation inference engines trained specifically for this purpose. Finally, the output code may be tested for syntax errors, logical errors, and so forth using automated, semi-automated, or manual debugging tools. More generally, any techniques known in the art may be used to convert a natural language expression of validation rules into a machine readable test plan as described herein.

Furthermore, while the foregoing description assumes that the machine readable test plan includes computer executable code implementing the test plan, it will be understood that other data formats or structures may also or instead be used. For example, a test plan may consist exclusively of a validation report containing a written description of how to validate the requirements for a manufacturing process, or may provide a schema or other data structure for expressing test plans or validation rules in a manufacturing environment, or any combination of these. Where the test plan expresses validation rules for a process or manufacturing environment with predefined schemas or other data structures, a machine readable portion of the test plan may include a test plan data structure formatted for use by applications executing in that manufacturing environment, e.g., by conforming to an appropriate schema, syntax, or other formal definition of structure for test plans.

As shown in step 1010, the method 1000 may include re-coding an application, e.g., based on the machine readable test plan, to apply one or more of the validation rules during the manufacturing process. Where a machine readable test plan includes code for an application, this may include a straightforward step of inserting the machine readable code at a suitable location within the application code. Alternatively, this may include the use of automated coding tools or a language model or other inference engine (s) to generatively modify the application code based on the machine readable test plan, or on a text-based portion of the test plan. The revised application may then be deployed to control the manufacturing process according to the test plan, and may be subsequently monitored or instrumented to ensure that the application is performing according to test plan, and/or that the application is meeting the underlying requirements.

According to the foregoing, there is further disclosed herein a system for computer-assisted test plan creation using generative AI. In general, the system may include a manufacturing process controlled by an application; a text description of one or more validation requirements for the manufacturing process; and a test plan generation module. The test plan generation module may be configured, e.g., by computer executable code executing on one or more processors, to perform the steps of: requesting a description of the application from a first large language model, and requesting a validation report from a second inference engine, the validation report including a human readable description of whether and/or how the application satisfies the one or more validation requirements for the manufacturing process based on the description of the application and the text description of the one or more validation requirements, or a human readable description of one or more validation failures or shortfalls that require remediation. In another aspect, the validation report may include machine readable code for implementing one or more validation rules in the test plan based on the validation requirements.

The test plan generation module may execute locally at a manufacturing facility, remotely on a cloud computing platform or virtual computing resource, or some combination of these, and may use any of the external resources described herein including, e.g., commercially available large language models and other inference engines, to identify structure in validation rules and express responsive test plans.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as described herein.

What is claimed is:

1. A computer program product comprising computer executable code embodied in a non-transitory computer readable medium that, when executing on one or more computing devices, performs the steps of:

receiving a video of a manufacturing process, the video including a visual recording of the manufacturing process and an audio recording of a concurrent narration by a user during the manufacturing process;

processing the video into a plurality of segments for each of a plurality of specific actions in the manufacturing process using computer vision to extract one or more video descriptions and corresponding time segments for one or more action segments of the video;

processing the audio recording by identifying one or more natural language action descriptions correlated to the one or more action segments of the video and extracting one or more text descriptions of the one or more action segments of the video of the manufacturing process using a speech-to-text model;

creating a description of the manufacturing process with a first language model, the description including a step description for each of the plurality of segments based on a multiplexed embedding of the one or more video descriptions of the one or more action segments from the visual recording and the one or more text descriptions of the one or more action segments from the audio recording;

transforming the description of the manufacturing process into an intermediate representation for use by a low-code or no-code tool to generate an application using a summary and analysis of the description from a second language model;

transforming the intermediate representation into a machine readable description that expresses programming logic for the manufacturing process based on a structure of the manufacturing process contained in the intermediate representation; and converting the machine readable description into executable code for the application to control the manufacturing process.

2. The computer program product of claim 1, wherein the video of the manufacturing process includes one or more mistakes during execution of the manufacturing process.

3. The computer program product of claim 2, wherein the audio recording includes a narrative description of the one or more mistakes.

4. The computer program product of claim 1, wherein one or more of the plurality of segments includes a quality control step.

5. The computer program product of claim 1, wherein processing the video into the plurality of segments includes parsing the video based on one or more keyframe detections correlated to user actions.

6. The computer program product of claim 1, wherein the intermediate representation includes pseudo-code.

7. The computer program product of claim 1, wherein the intermediate representation includes one or more of a flow-chart, a list of instructions, and a text description.

8. The computer program product of claim 1, wherein transforming the intermediate representation into the application includes converting one or more forks in the manufacturing process into user inputs.

9. The computer program product of claim 1, wherein transforming the intermediate representation into the application includes converting one or more data collection steps into input steps.

10. The computer program product of claim 1, further comprising code that performs the steps of deploying the application and monitoring a process flow of the application to ensure that the manufacturing process is proceeding according to the description.

11. A method comprising:

receiving a video of a manufacturing process including one or more process steps, the video including a visual recording of the manufacturing process and an audio recording of a concurrent narration by a user during the manufacturing process;

processing the video into a plurality of specific actions in the manufacturing process using computer vision to obtain feature data from the visual recording including one or more video descriptions and corresponding time segments for one or more action segments of the video of the manufacturing process;

processing the audio recording by identifying one or more natural language action descriptions correlated to the one or more action segments of the video and extracting one or more text descriptions of the one or more action segments of the manufacturing process using a speech-to-text model;

creating a description of the manufacturing process with a first language model, the description including a step description for each of the one or more action segments based on a multiplexed embedding of the one or more video descriptions of the one or more action segments from the visual recording and the one or more text descriptions of the one or more action segments from the audio recording;

transforming the feature data into an intermediate representation for use by a low-code or no-code tool to generate an application using a summary and analysis of the feature data from an inference engine;

transforming the intermediate representation into a machine readable description that expresses programming logic based on a structure of the manufacturing process in the video; and converting the machine readable description into data for the application to control the manufacturing process.

12. The method of claim 11, wherein the data includes one or more of computer executable code for the application, text, an image, a user interface layout, a connector, a library, a video segment, an audio segment, and a help library for supporting the manufacturing process.

13. The method of claim 11, wherein the concurrent narration includes a spoken narration of the manufacturing process by the user.

14. The method of claim 13, wherein processing the video includes extracting a natural language description of the manufacturing process from the spoken narration.

15. The method of claim 11, wherein the one or more process steps include one or more mistakes during execution of the manufacturing process.

16. The method of claim 11, wherein the one or more process steps include one or more quality control steps.

17. The method of claim 11, wherein transforming the feature data into the intermediate representation using the summary and analysis from the inference engine includes supplementing the feature data with supplemental descriptive materials to the inference engine, the supplemental descriptive materials including one or more of a flow chart, a user manual, and a text description for the manufacturing process.

18. The method of claim 11, wherein the inference engine includes at least one of a visual language model, an audio language model, and a large language model.

19. The method of claim 11, wherein the feature data includes one or more of an action segment, a keyframe detection correlated to the action segment, and a natural language action description correlated to the action segment.

20. A system comprising:

a manufacturing environment configured to perform a manufacturing process;

a recording device configured to acquire a video including a visual recording of the manufacturing process and an audio recording of a concurrent narration by a user during the manufacturing process;

a memory storing the video; and an application generator configured to generate an application to control the manufacturing process by performing the steps of:

processing the video into a plurality of segments for each of a plurality of specific actions in the manufacturing process using computer vision to extract one or more video descriptions and corresponding time segments for one or more action segments of the video, processing the audio recording by identifying one or more natural language action descriptions correlated to the one or more action segments of the video and extracting one or more text descriptions of the one or more action segments of the manufacturing process using a speech-to-text model, creating a description of the manufacturing process with a first inference engine, the description including a step description for each of the plurality of segments based on a multiplexed embedding of the one or more video descriptions of the one or more action segments from the visual recording and the one or more text descriptions of the one or more action segments from the audio recording, transforming the description of the manufacturing process into an intermediate representation for use by a low-code or no-code tool to generate the application using a summary and analysis of the description from a second inference engine, transforming the intermediate representation into a machine readable description that expresses programming logic for the manufacturing process based on a structure of the manufacturing process contained in the intermediate representation, and converting the machine readable description into executable code for the application to control the manufacturing process.

* * * * *